United States Patent [19]
Danielson et al.

[11] Patent Number: 5,468,947
[45] Date of Patent: Nov. 21, 1995

[54] POCKET SIZE DATA CAPTURE UNIT WITH PROCESSOR AND SHELL MODULES

[75] Inventors: Arvin D. Danielson, Solon; Dennis A. Durbin, Cedar Rapids, both of Iowa

[73] Assignee: Norand Corporation, Cedar Rapids, Iowa

[21] Appl. No.: 40,313

[22] Filed: Mar. 29, 1993

Related U.S. Application Data

[63] Continuation-in-part of Ser. No. 451,322, Dec. 15, 1989, Pat. No. 5,227,614, and a continuation-in-part of Ser. No. 947,036, Sep. 16, 1992, Pat. No. 5,308,966, which is a continuation of Ser. No. 875,791, Apr. 27, 1992, abandoned, which is a continuation-in-part of Ser. No. 422,052, Oct. 16, 1989, abandoned, which is a division of Ser. No. 894,689, Aug. 8, 1986, Pat. No. 4,877,949, said Ser. No. 451,322is a continuation-in-part of Ser. No. 143,921, Jan. 14, 1988, abandoned, which is a continuation-in-part of Ser. No. 897,547, Aug. 15, 1986, abandoned.

[51] Int. Cl.[6] ..................................................... G06K 7/10
[52] U.S. Cl. ............................................. 235/472; 235/462
[58] Field of Search ..................................... 235/375, 379, 235/380, 382, 383, 381, 487, 492; 902/20–26; 364/700, 704, 705.01, 705.03, 705.06, 706, 708.1, 709.01, 709.09, 709.1, 709.11

[56] References Cited

U.S. PATENT DOCUMENTS

| | | | |
|---|---|---|---|
| 4,247,908 | 1/1981 | Lockhart, Jr. et al. | |
| 4,634,845 | 1/1987 | Hale et al. | 902/22 |
| 4,705,211 | 11/1987 | Honda et al. | 902/26 |
| 4,715,385 | 12/1987 | Cudahy et al. | 364/704 |
| 4,721,849 | 1/1988 | Davis et al. | 235/472 |
| 4,788,658 | 11/1988 | Hanebuth | 364/708.1 |
| 4,843,223 | 6/1989 | Shino | 235/487 |
| 4,850,009 | 7/1989 | Zook et al. | 235/375 |
| 4,870,604 | 9/1989 | Tatsuno | 364/708.1 |
| 4,890,832 | 1/1990 | Komaki | 364/709.1 |
| 4,922,111 | 5/1990 | Kuwano et al. | 235/472 |
| 4,967,188 | 10/1990 | Collins | |
| 4,972,496 | 11/1990 | Sklarew | 382/59 |
| 5,012,407 | 4/1991 | Finn | |
| 5,047,615 | 9/1991 | Fukumoto et al. | 235/375 |
| 5,050,207 | 9/1991 | Hitchcock | 235/382 |
| 5,123,064 | 6/1992 | Hacker et al. | 364/709.11 |
| 5,133,076 | 7/1992 | Hawkins et al. | 364/709.09 |

FOREIGN PATENT DOCUMENTS

| | | | |
|---|---|---|---|
| 57-105068 | 6/1982 | Japan | 364/706 |
| 2201125 | 8/1988 | United Kingdom | 382/3 |

OTHER PUBLICATIONS

"Extension Device for a Personal Computer", IBM Technical Disclosure Bulletin, vol. 27, No. 12, May 1985, pp. 6887–6890 (no author given).

Weinstein, S., "Smart credit cards: the answer to cashless shopping", IEEE spectrum, Feb. 1984, pp. 43–49.

Primary Examiner—Donald Hajec
Assistant Examiner—Mark S. Tremblay
Attorney, Agent, or Firm—Suiter & Associates

[57] ABSTRACT

A hand-held processing system wherein a peripheral module may receive therein a computer processor basic module of standardized construction, with a user-immune real-time multi-tasking operating system. Advantageously the peripheral module or computer processor module may include a touch screen or other highly versatile and compact data input/output device adaptable to graphical and/or other input/output modes suitable for different applications, languages and the like.

22 Claims, 16 Drawing Sheets

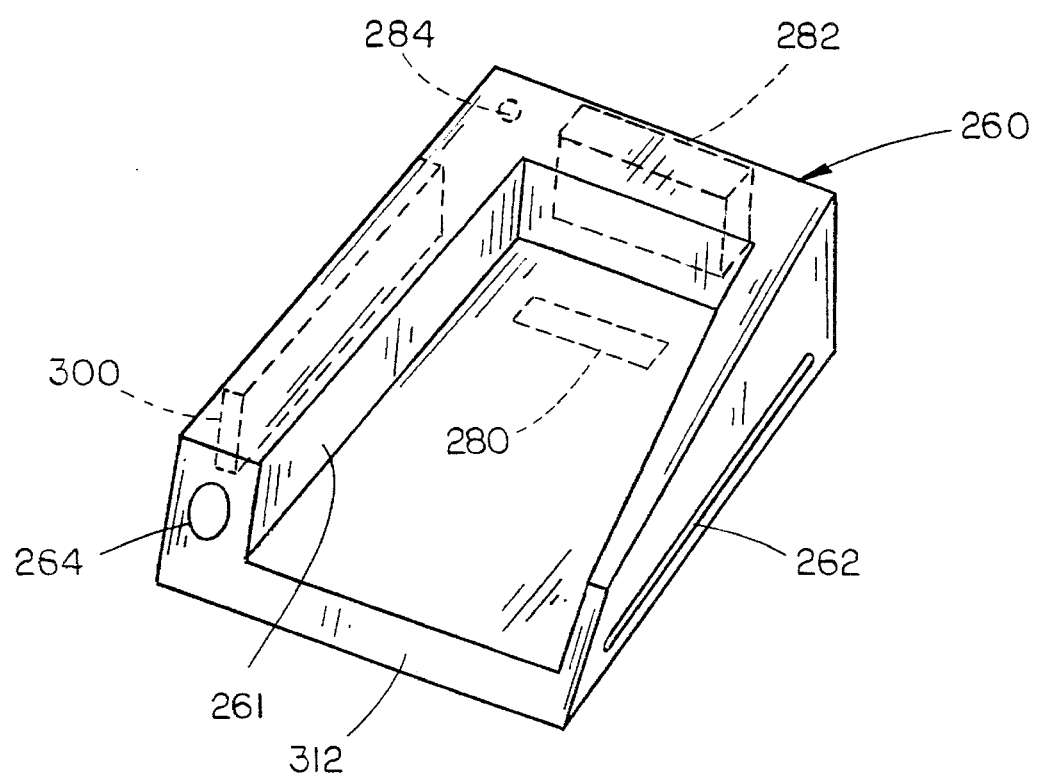
FIG. 10
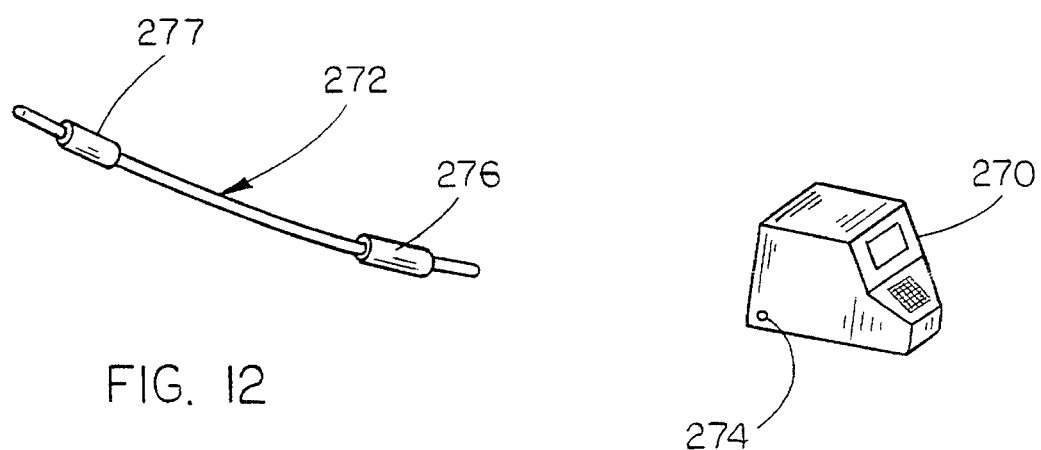
FIG. 12
FIG. 11

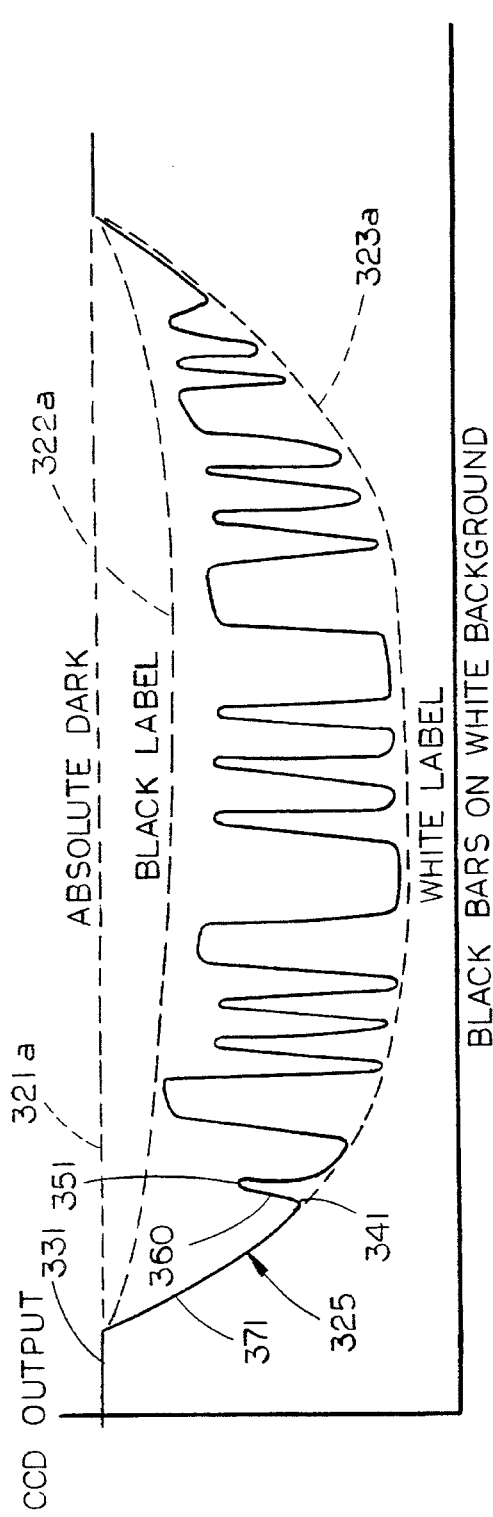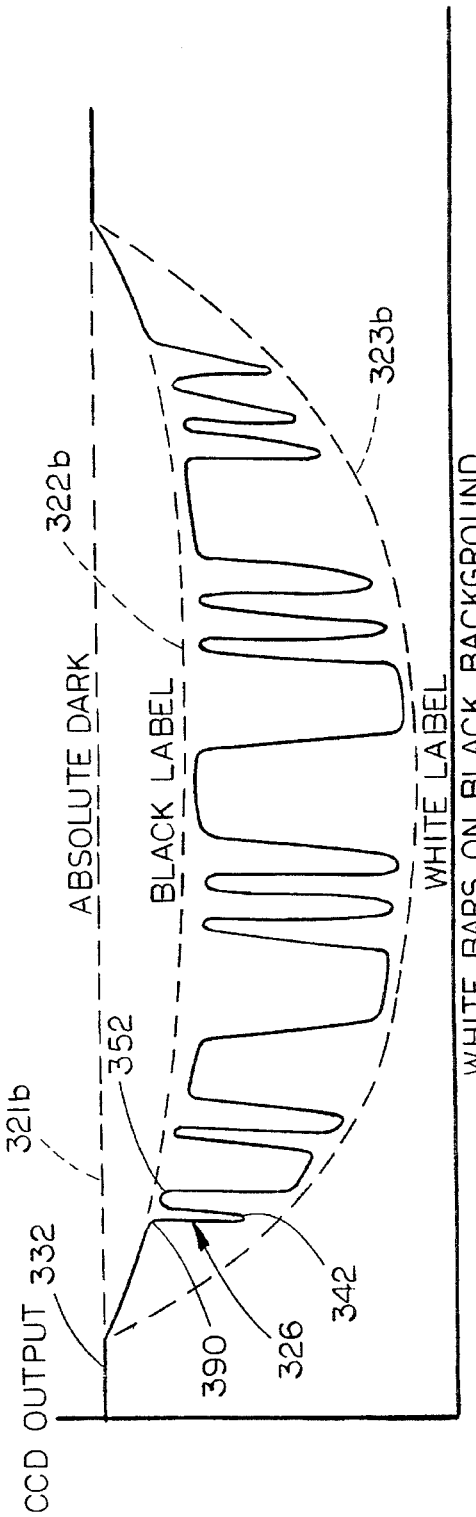

POCKET SIZE DATA CAPTURE UNIT WITH PROCESSOR AND SHELL MODULES

CROSS-REFERENCE TO RELATED APPLICATIONS

The present application is a continuation-in-part of application Ser. No. 07/451,322 (attorney docket number 5769Y), filed Dec. 15, 1989, now U.S. Pat. No. 5,227,614, issued Jul. 13, 1993, which is a continuation-in-part of application Ser. No. 143,921 (attorney docket number 5769X), filed Jan. 14, 1988, now abandoned, which is a continuation-in-part of application Ser. No. 06/897,547 (attorney docket number 5769) filed Aug. 15, 1986, now abandoned.

The present application is also a continuation-in-part of application Ser. No. 947,036 (attorney docket number 35740XYA), filed Sept. 16, 1992, now U.S. Pat. No. 5,308,966, issued May 3, 1994, which is a continuation of application Ser. No. 875,791 (attorney docket number 35740XY), filed Apr. 27, 1992, now abandoned, which is a continuation-in-part of application Ser. No. 07/422,052 (attorney docket number 35740X), filed Oct. 16, 1989, now abandoned, which is a division of application Ser. No. 06/894,689 (attorney docket number 5740), filed Aug. 8, 1986, now U.S. Pat. No. 4,877,949, issued Oct. 31, 1989.

Each of U.S. Pat. No. 5,227,614 (attorney docket number 5769Y) issued Jul. 13, 1993, U.S. Pat. No. 4,877,949 (attorney docket number 5740) issued Oct. 31, 1989, and U.S. Pat. No. 5,019,699 (attorney docket number 6240) issued May 28, 1991, is hereby incorporated herein by reference in its entirety including drawings and appendices.

BACKGROUND OF THE INVENTION

This invention relates to shirt pocket size computer processor system means, and particularly to a plural module computer processor system capable of incorporating various data entry peripheral devices and of coupling with various data storage and data transmission devices while yet being suitable to be carried on the person of an individual user throughout a working day.

A long-standing problem in the hand-held computer field has been to provide a compact and efficient system for data capture while yet achieving low production cost. It is conceived that a breakthrough can be realized by an optimum plural module system configuration.

In another aspect, the invention relates to novel terminal means for association with information cards and is particularly concerned with such terminal means for use by an individual user in communication with another computer system. There are many circumstances for example where an individual may desire to carry out transactions with a central computer processing station. In one example, a racing establishment such as a horse racing organization may desire to enable individual members having accounts with the organization to place bets from various locations such as home or office. In such a circumstance, it would be highly advantageous if the individual could communicate directly with a central computer system placing with the system all the information concerning a bet, and receive from the computer system essentially instantaneous information as to whether such a bet has been accepted. Another example relates to food service functions where orders may be transmitted to a central order processing center, and where credit or debit card purchases may be approved and/or related data stored at the central processor. Still another example is in the field of direct store delivery of merchandise. A pocket size terminal may contain the necessary information concerning the items being delivered and may be coupled with the store computer system to effect a paperless delivery transaction.

SUMMARY OF THE INVENTION

Accordingly, it is an object of the present invention to provide a plural module system configuration that is adaptable to a wide range of data capture applications while retaining shirt pocket size and utilizing a core computer processor module of standard size and characteristics so as to achieve the economy of large scale production.

In a preferred embodiment, the standardized computer processor module is provided with a multi-tasking operating system such that battery monitoring software and diagnostic routines will run at a fixed priority level at all times while a wide range of applications software can be run concurrently without jeopardizing the reliability of the system under extended portable operating conditions.

Preferably, the standardized computer processor module is selectively associated with peripheral device shell configurations for adapting the system to specific applications. For example, a shell configuration may include a scanner module for reading bar codes and a manual data entry and display means specifically tailored to a particular job such as package tracking, inventory, direct store delivery accounting, or the like. As a specific embodiment, the peripheral device shell may comprise a digitizer input tablet and display means which can receive handwritten input data and provide a desired confirming display. A conversational mode may provide for multiple interpretive displays of successively lesser probability in response to an input character for a word which is ambiguous with function key selection of the correct interpretation, or the like. A voice input and/or voice synthesizer shell module is another exemplary embodiment. Again in a conversational mode, the module may repeat input words in synthesized speech and/or provide a visual display thereof whereupon actuation of a function button or the like may instruct the module to present a second most probable selection from its vocabulary.

The handwritten or voice input modules may include a learning program for progressively improving recognition of the individual user's characteristic handwritten or voice input. Physical objects related to a given user application may be assigned respective code words e.g. of eight bits length; thus in the case of a food service function, in a food selection mode, the writing of the letter "P" with a stylus on an input tablet or the spoken word "potato chip" may be stored as the ASCII code for the character P in a special food selection storage. A nonvolatile storage section would enable the translation of the "P" code in food selection mode into the string of characters "potato chips" on the display and/or produce the synthesized speech output "potato chips". In a conversational mode, if there were two or more P items, the shell module could in response to a "P" input, present on the display a listing of the P selections, e.g., as P1, P2, P3, etc., whereupon the user could enter with a stylus or the like, the correct numeral "1", "2", "3", etc.

According to an exemplary embodiment, a peripheral device shell may provide a transparent tablet serving as data input and as a display window. A sonic wave digitizer arrangement for example may sense stylus (or finger) position on the tablet. The display may include a graphics liquid crystal display (LCD) behind the transparent tablet for defining a keyboard in a touch data entry mode, and for display of data supplied by touch entry, or by other means such as handwritten input, speech input, optical scanner input, and so on. Keyboard touch selection positions can be labeled by means of icons (pictorial images) where this is most effective. The shirt pocket size unit may be of sealed construction so as to be ideal for meter reading, timber inventory, or any environmentally demanding application.

The computer processor module may be employed with peripheral devices such as printers, laser bar code readers, RF modules, smart card interface modules, disk systems, full travel keyboards, high resolution displays, local area network (LAN) interface modules, etc., and various such devices may be combined in a single self-contained battery powered hand-held unit.

It is also an object of the present invention to provide a terminal means which can be utilized by an individual at various locations for direct communication with another computer system for the purpose of carrying out desired individual transactions.

It is another object of the present invention to provide such a terminal which can be conveniently carried on the person of an individual, for example, in a shirt pocket.

A further object of the invention is to produce a terminal unit which is adapted to incorporate a means for reliably identifying an individual who uses the terminal and wherein the terminal facilitates each step in carrying out the desired transaction.

A feature of the invention resides in the provision of a terminal capable of removably receiving an information card with extensive memory capability and which, together with the terminal, can be held in one hand during entry of information concerning a transaction.

In accordance with a further feature, such a hand-held terminal system may incorporate means for two-way communication with a central computer system, e.g., via telephone lines or a radio frequency link.

In accordance with another feature, such a hand-held terminal system may be provided with a scanner for optically scanning visual information such as bar codes.

In accordance with another feature of the invention, such a hand-held terminal system may have dimensions of width and length comparable to a standard intelligent information card and of thickness to fit in the pocket, such as a shirt pocket.

In accordance with still another feature of the invention, such a terminal configuration is designed so as to be adaptable to a wide variety of applications without change in its basic housing configuration.

The foregoing objects will be more fully understood by reference to the following detailed description, and other and further objects, features and advantages will also become apparent from the present disclosure as a whole and from the individual features and relationships of the appended claims.

BRIEF DESCRIPTION OF THE DRAWINGS

FIG. 10 is a diagrammatic perspective view showing an exemplary shell configuration for readily receiving the core processor module of FIG. 9, to form a plural module terminal system, e.g., adapted for direct store delivery accounting;

FIG. 11 shows a store terminal device for coupling with the system of FIGS. 9 and 10;

FIG. 12 shows an exemplary coupling means for coupling the system of FIGS. 9 and 10 with the store terminal of FIG. 11;

FIGS. 13A and 13B are plots showing the variation of a bar code signal over the length of the bar code as generated for example when the illumination geometry is non-uniform, FIG. 13A being the case of black bars on a white background and FIG. 13B showing the signal variation for white bars on a black background;

DETAILED DESCRIPTION

Figure 1:
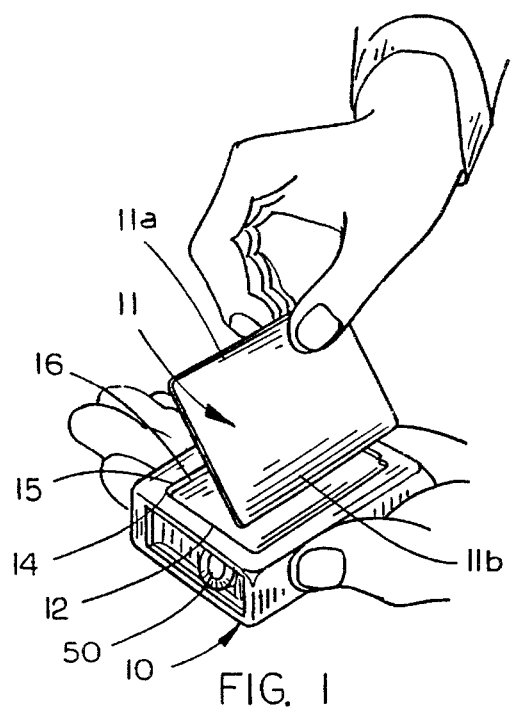
FIG. 1 is a somewhat diagrammatic perspective view illustrating the insertion of an intelligent information card into a receptacle of a terminal means in accordance with the present invention while the terminal means is held by one hand.

FIG. 1 is a perspective view illustrating a preferred terminal configuration 10 of a size to be held in the hand of the user. FIG. 1 illustrates the placing of an information card 11 into a receptacle 12 of the terminal. The card 11 may be a standard intelligent information card conforming with international standards such as the present ISO standard. Such a card may have the same length and width and thickness as a standard credit card now in use. By way of example, such a card may have an array of eight contact terminals at one side thereof providing for interface with other devices. Such a card may have an electrically erasable programmable read only memory of a sufficient capacity to record an individual's account number, personal identification number and other information which may be desired for reliably identifying the individual. Further, such a memory may have a capacity for receiving extensive additional information such as might be required in effecting betting on a number of horse races.

By way of example, receptacle 12 may be provided with nub means 14 which is configured to cause the card 11 to flex at its edge 11 a as it is pivoted into receptacle 12. Thus the nub means 14 may be spaced above the floor of the receptacle 12 by a distance slightly greater than the thickness of the card. An opposite side edge 11b of card 11 may be inserted under similar nub means at the opposite side of receptacle 12 and the card 11 then pivoted downwardly until edge 11a of the card is snapped under nub means 14. The nub means at opposite sides of receptacle 12 which cooperate with card edges 11a and 11b hold the card 11 in receptacle 12, and spring urged contacts in the floor of receptacle 12 make pressure engagement with the array of eight contacts on the underside of the card, once the card has been inserted.

Any suitable means may be employed to facilitate removal of a card from the receptacle 12. For example, a wall 15 of terminal 10 may be provided with a notch 16 enabling insertion of a fingernail or stylus under edge 11a of the card for prying the card upwardly and out of the recess. The standard card 11 is sufficiently flexible so that this is readily accomplished.

In the embodiment of FIG. 1, a touch screen 17 occupies the side of the terminal opposite receptacle 12 and has an area generally comparable to the area of the standard card. By way of example, the touch screen may utilize LCD (liquid crystal display) technology and may be capable of displaying a number of lines of characters, for example four lines relating to four bets and additional lines which may, for example, provide an integrated graphic display (e.g., a single line of Chinese characters).

By way of example, associated with the touch screen at a surface 20 may be suitable indicia such as 21–24 for explaining the format of the display. In the specific illustration of FIG. 2, the characters "HV" may represent the initial letters of the name of a race track (e.g., Happy Valley), the next series of characters representing the data (e.g., year, month and day of month). Further characters on the display may relate to the day of the week, the type of bet or the like.

Figure 3:
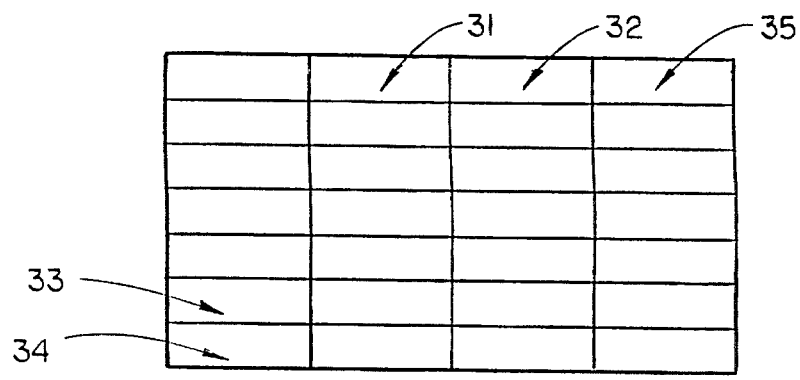
FIG. 3 illustrates a matrix of touch regions for a touch screen such as indicated in FIG. 2.

In the example of a transaction involving betting on a horse race, an exemplary keyboard display for touch screen 17 is indicated in FIG. 3. In an example, where several race tracks may be involved, the identities of respective race tracks may be displayed at locations such as 31 and 32 in FIG. 3. Each location may display indicia indicating the programmed significance of the location. Simply by way of example, a prompt message at lines 33 and 34 might instruct the user to select the race track where the race to be the subject of a wager is to take place. At the same time, indicia representing the two race tracks would appear at 31 and 32. The user would then press location 31 or 32 with his finger to indicate the identity of the race track. A similar procedure could be followed for identifying the day of the race, the number of the particular horse on which the bet is being placed, the amount of the wager, and so on.

Figure 2:
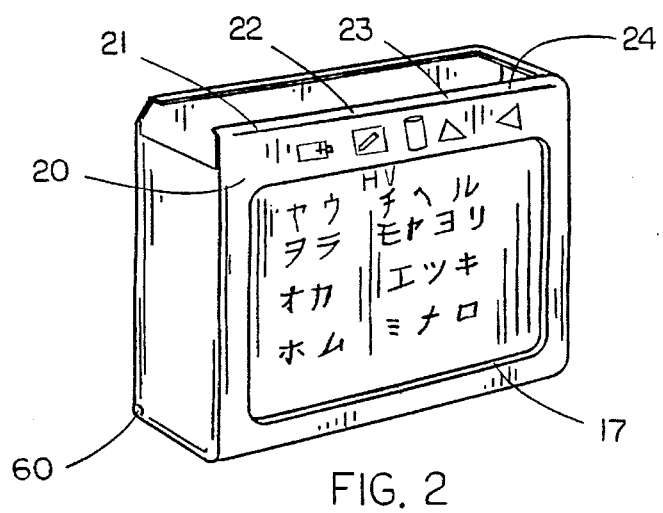
FIG. 2 is a perspective view showing a terminal means in accordance with the present invention and showing an exemplary display including four single lines of characters and at the bottom Chinese characters occupying the height of two character lines of the display.

In the preferred embodiment of FIGS. 1 and 2, the terminal 10 is provided with an acoustic coupling means 50 which may serve to couple the terminal with telephone lines, for example. Thus in the case of betting transactions, once the user of the terminal has entered desired bets, for example on a number of horse races, the user may couple the terminal, e.g. via an acoustic coupler, with a handset of a conventional telephone, for establishing two-way telephone communication with a central computer system equipped to deal with the particular type of transaction and to authorize the individual participant. The touch screen 17 may display suitable prompt messages in establishing the telephone link with the central computer, or the processor of the terminal 10 may itself be programmed to establish the telephone link automatically, for example in response to actuation of a "SEND" location 35 of FIG. 3. Once communication is established, the processor of terminal 10 is able to transmit the data stored on the information card 11 via the telephone link to the central computer system so that the central computer system can verify that the individual is authorized to carry out the relevant transactions. In the case of horse race betting, the information on the particular race and particular horses involved and the other details of the bet would be transmitted to the central computer system for verification and for evaluation of the total amount being bet, for example in relation to the individual's established account balance.

Also in the preferred embodiment as shown in FIG. 2, the housing is provided at a corner thereof with an optical scanner module 60 which may be utilized as a hand-held bar code scanner, and which also can serve for receiving optical communication via a suitable receiving device. In the case where the terminal utilizes rechargeable batteries, a receiving boot could automatically couple with a charging circuit for the battery means and this boot could also be provided with a host computer or suitable communication to a host computer system such that data from the intelligent card 11 and from the memory of the terminal itself could be communicated with the host system via an optical link including the scanner module 60, if desired.

Figure 4:
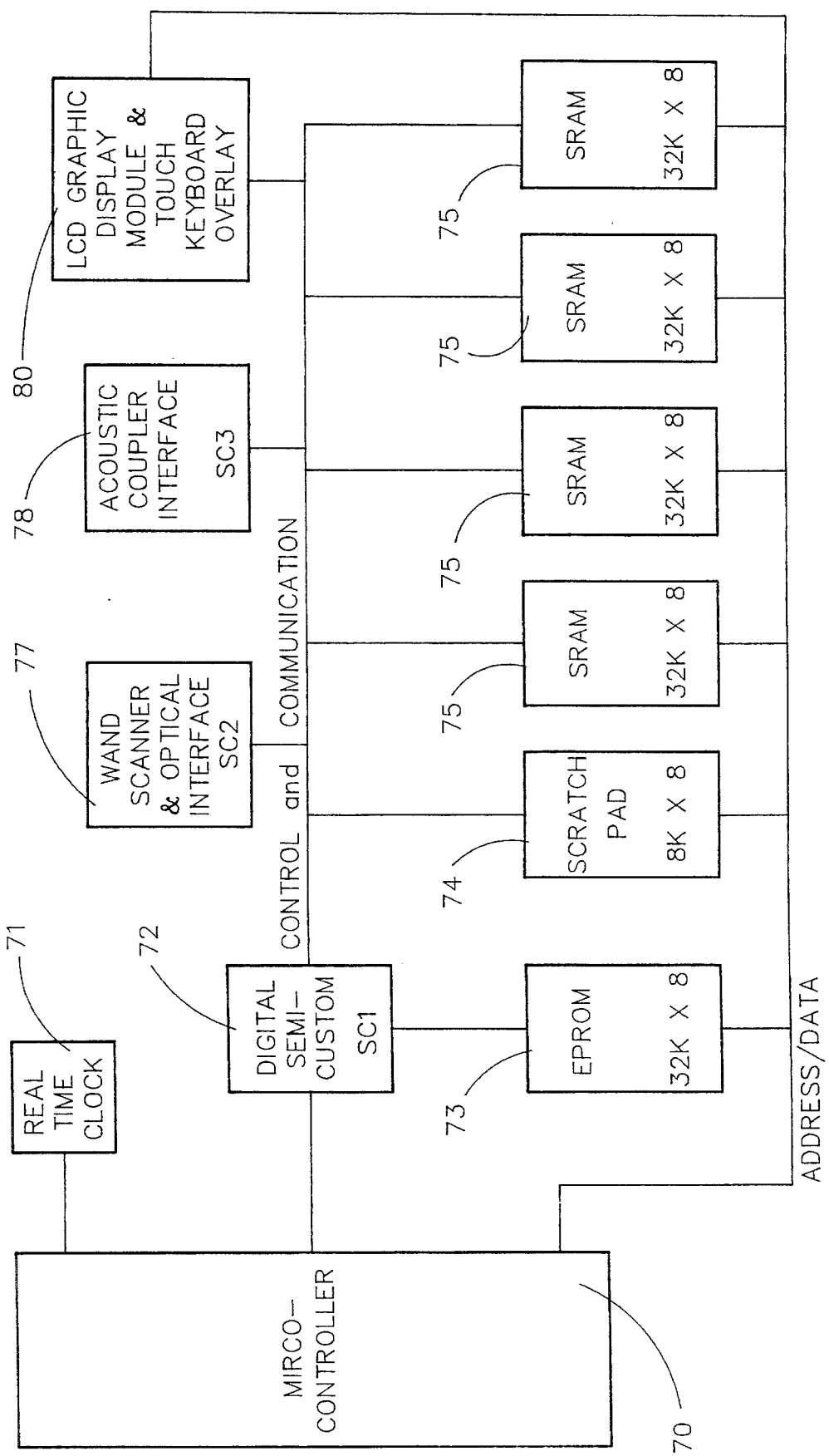
FIG. 4 is a schematic block diagram for illustrating an exemplary processing means occupying the interior of the terminal of FIGS. 1 and 2.

Also as a preferred implementation, FIG. 4 illustrates a suitable processing system for the housing 10, including a micro-controller 70, a real-time clock 71, control and communication circuits 72, EPROM 73, random access components 71 and 75, a wand scanner and optical interface component 77, an acoustical coupler interface 78 and a module 80 for controlling character and or graphic display of the touch keyboard screen for a particular desired application.

By way of example intelligent information card 1 may be approximately 3⅜ inches by 2⅛ inches (about 9.5 centimeters by 5.4 centimeters). The dimensions of displays 17 and 117 are thus approximately comparable to the length and width of the card. (The card thickness is standard and about 1/32 inch). In FIGS. 1–4, the overall dimensions of the terminal 10 are not substantially greater than the corresponding card dimensions; the thickness is such that terminal 10 fits in an ordinary shirt pocket. By way of example the terminal may have a thickness of less than one inch i.e. less than 2.5 centimeters.

Figure 5A:
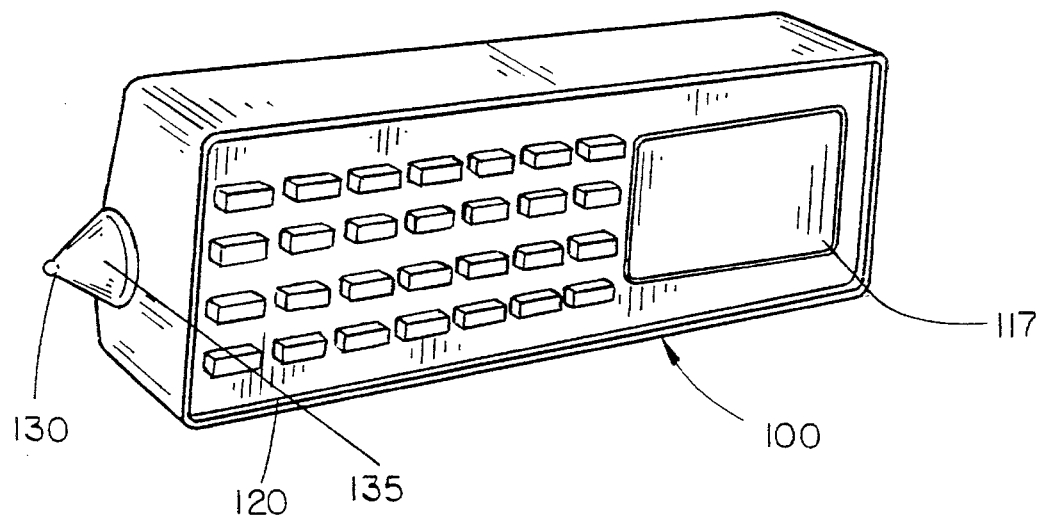
FIG. 5A is a somewhat diagrammatic perspective view showing a terminal which may be utilized particularly for selecting desired functions in a particular application of the terminal of FIGS. 1–4.
Figure 5B:
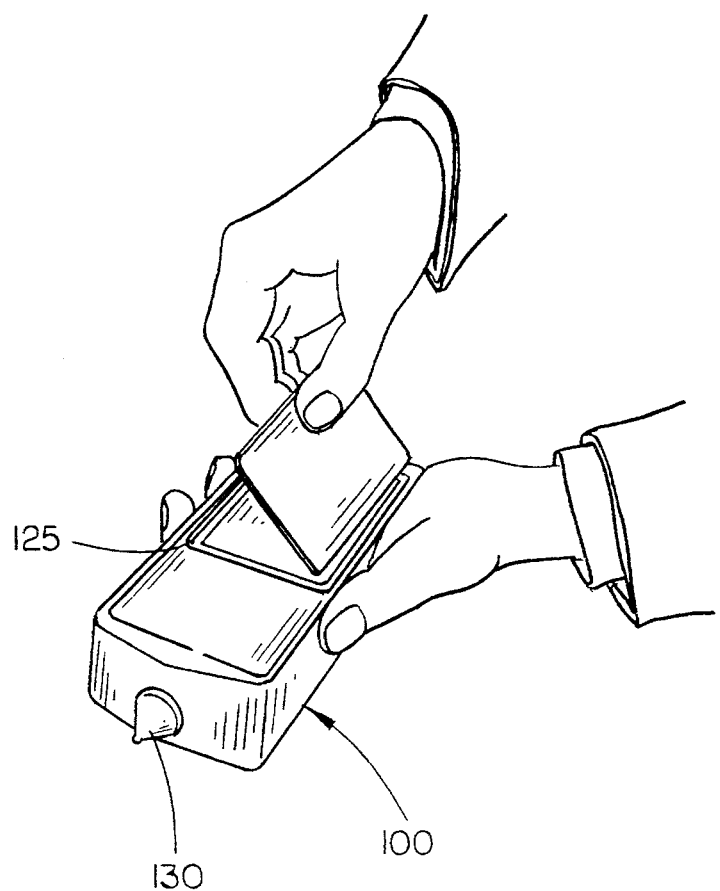
FIG. 5B shows the insertion of an intelligent information card into a receptacle of the terminal of FIG. 5A, while the terminal is held by one hand.

In the development of a preferred pocket-size terminal such as indicated in FIGS. 1 and 2, it is sometimes convenient to utilize a larger development terminal such as indicated at 100 in FIGS. 5A and 5B, which may utilize the same size of touch screen 117 (i.e. two inches by three inches) but may further utilize a highly versatile keyboard 120 and a much larger memory capacity so that many different features can be tried out for a particular application. At the rear of the touch screen 117 there may be a receptacle 125, FIG. 5B, for an intelligent information card exactly corresponding to receptacle 11 of FIG. 1. The terminal 100 is shown as being provided with an optical scanner module 130, which may function in the same manner as the module 60 of the preferred embodiment of FIGS. 1 and 2. In the example of FIGS. 5A and 5B, rechargeable batteries may be utilized and a boot receiving the housing of terminal 100 may have provision for optical coupling with the computer system of the housing via an optical output means 135. Optical communication from a host computer system may be via the optical scanner module 130 as in the embodiment of FIGS. 1–4. The housing of terminal 100 is provided with an acoustical coupling means for telephonic communication corresponding to the acoustical coupling means 50 of FIG. 1. An exemplary embodiment according to FIGS. 5A and 5B may utilize internal components as indicated in FIG. 6.

Figure 6:
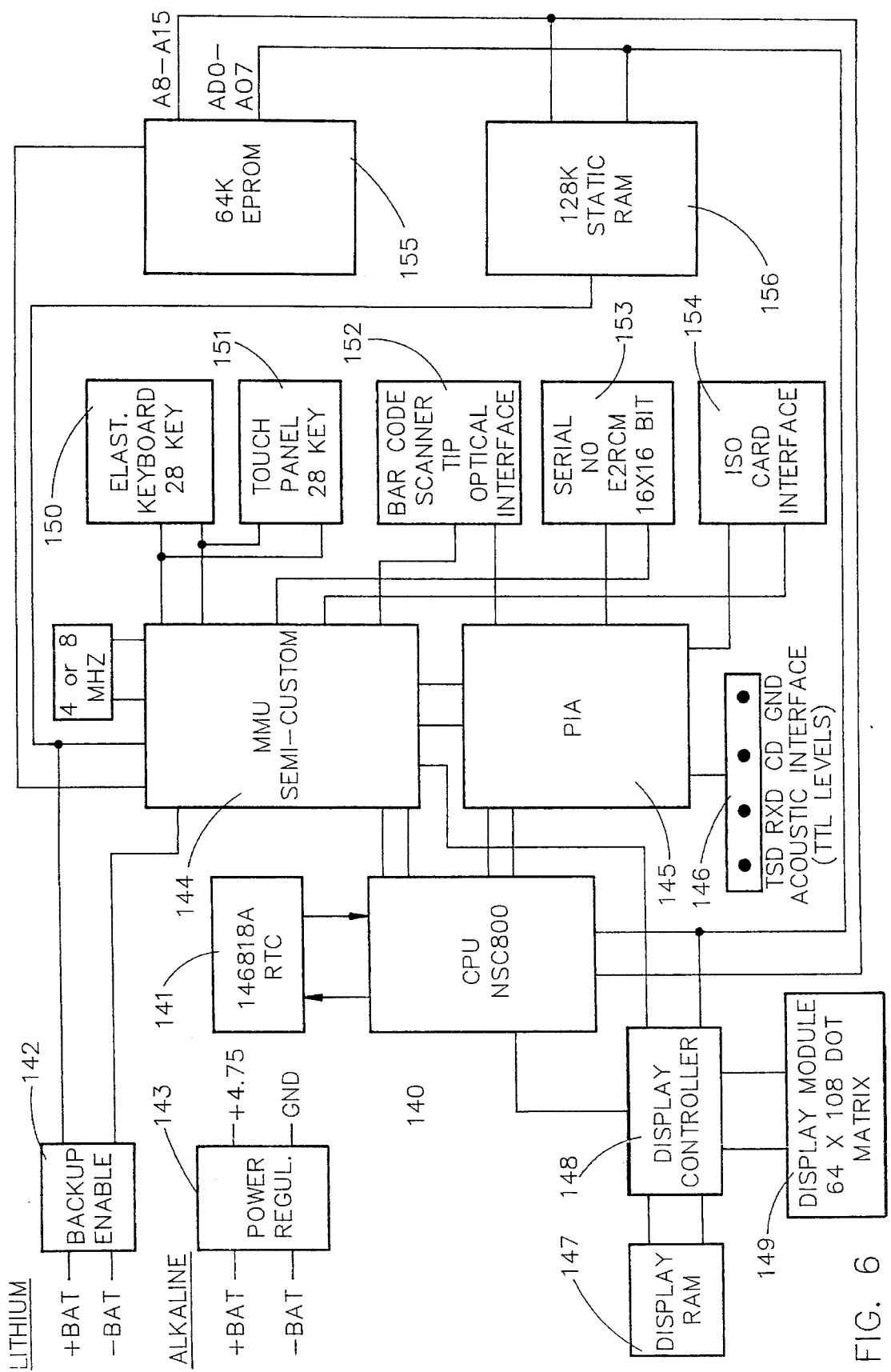
FIG. 6 is a somewhat schematic block diagram for illustrating the electronic processing components which may be utilized with the embodiment of FIGS. 5A and 5B.

In the specific embodiment of FIG. 5, components 140–156 may have the functions and parameters as indicated by labels for the respective components in FIG. 6.

DESCRIPTION OF FIGS. 7 THROUGH 12

Figure 7:
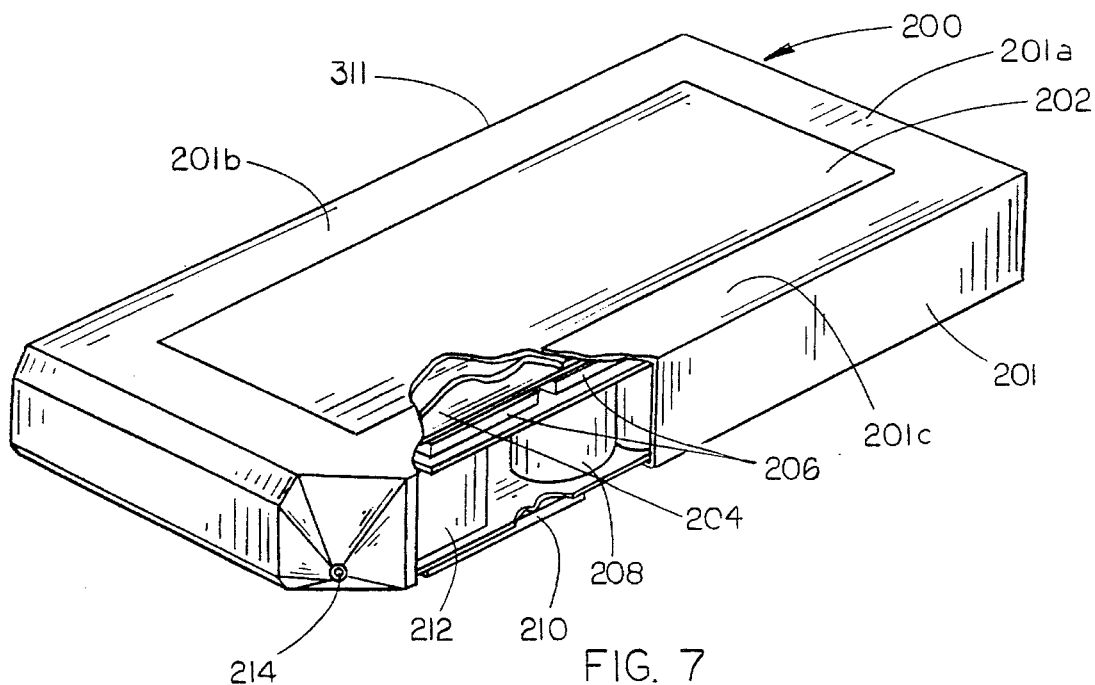
FIG. 7 is a diagrammatic perspective view of a shirt pocket size terminal means in accordance with the present invention, including a scanner tip, and having portions broken away to show internal components.
Figure 8:
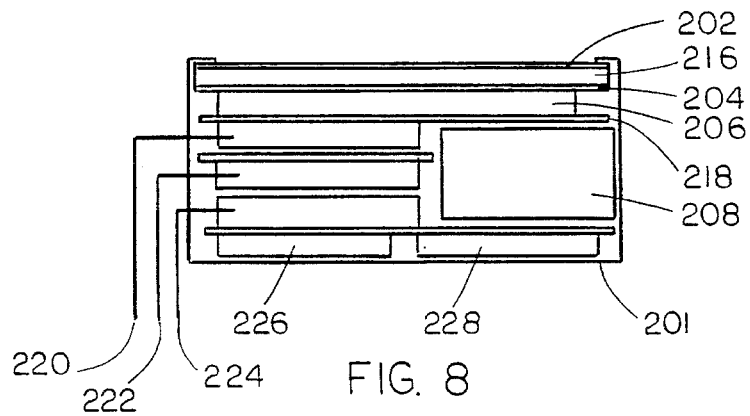
FIG. 8 is a diagrammatic cross sectional view for indicating internal components of the terminal means of FIG. 7.
Figure 9:
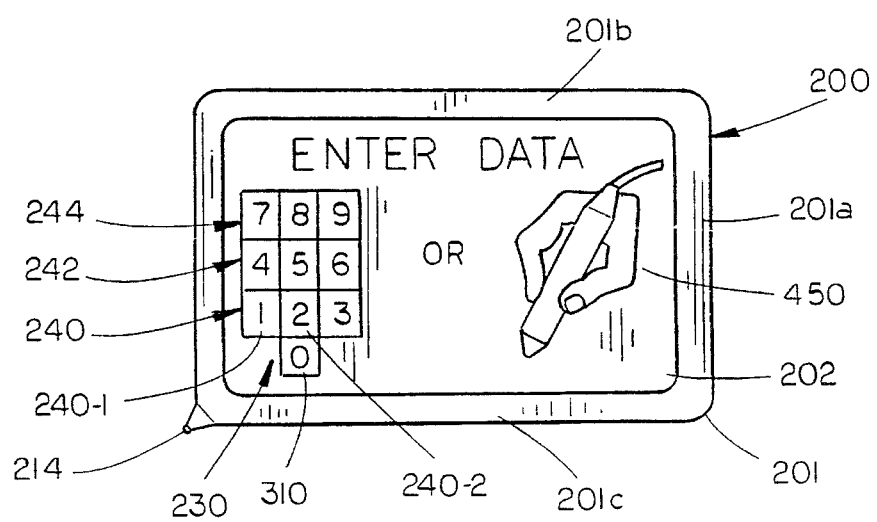
FIG. 9 is a diagrammatic view of a core processor module with touch screen type display and having length and width comparable to a standard credit or debit card and thickness to fit in a shirt pocket.

FIGS. 7, 8 and 9 show a shirt pocket size terminal configuration 200 generally corresponding to that of FIGS. 1–4, but omitting the card receptacle 12, terminal 200 includes the following components:
201—casing
202—membrane keyboard
204—liquid crystal display
206—display drivers
208—batteries
210—real time clock
212—scanner module
214—scanner tip
216—plastic support for membrane keyboard 202 (FIG. 8)
218—printed circuit board
220—display keyboard controller
222—RAM
224—microprocessor
226—ROM-A/D
228—real time clock, decode circuits Referring to the graphics display of FIG. 9, data input into unit 200 may be by means of a touch screen display as indicated at region 230, or by means of a digitizer system for sensing the position of a manually held stylus.

Exemplary characteristics for such a unit are summarized as follows:

V25 CMOS MICROPROCESSOR 8 MHZ
  16 bit arithmetic logic unit
    8086 software compatible
  16K byte mask ROM
    retains VRTX operating system
    diagnostic/power control routines
    sophisticated loader
1 MEGABYTE ADDRESS RANGE
2 UARTS—
  Full Duplex
  Internal Baud Rate Generators
RAM CMOS STATIC
  1 Megabyte—Less 16K ROM and 512 Internal RAM and SFR
  Holds Application Programs
  Also is Data Storage
  Battery Back-Up (Non-Volatile)
REAL TIME CLOCK/CALENDAR
  Provides Date/Time Information
  Back-Up
PLASTIC LCD DISPLAY
  64×128 Pixel Graphics Dot Matrix
  Built-In ASCII Character Generator
  Programmable Character Capability
  Limited Animation Capability
TRANSPARENT KEYPAD
  50 Keys in 5×10 Matrix
  Defined by Display For Location, Size, & Legend
BUILT-IN WAND TYPE SCANNER
  User Input Capability In Addition To Keypad
RECHARGEABLE BATTERIES
  Nicad or Lithium
  Complete Control/Monitor Via Software
  Offers Highly Reliable Remaining Battery Operating Time
  Gauge
  Provides power to RAM+RTC Under All Conditions
I/O CONNECTOR
  8 Pin
  Programmable
  Only Ground and Charge Pins Dedicated
  5 Volt Interface
  Never Powers Peripherals
ENVIRONMENTALLY SEALED
  Plastic Case is Glued or Sonic Welded
  Repair Procedure Is To Cut Case Away and Replace
  Can Be Submerged

DISCUSSION OF FIGS. 7, 8 AND 9

The main attractions of a V25 micro-controller for the system of FIGS. 7, 8 and 9 are that it is CMOS, very high speed, and sixteen bits internal, with a nice collection of built-in peripherals. The fact it is 8086 software compatible means that VRTX (versatile real-time operating system) can easily be ported to the V25, with the addition of new I/O drivers. VRTX is a multi-tasking operating system, so the battery control circuitry software will run at a fixed priority level at all times as will diagnostic routines. Applications will be moved in and out as necessary.

The one megabyte of CMOS static RAM and the RTC are always supplied power. When battery voltage drops below a selected value, e.g., 4.5 volts, (the fuel gauge will read zero at this point) the unit shuts down and cannot be worked unless proper power is supplied to it on its charge pin. The unit will appear to shut down when not actively doing anything; however, touching the keypad will bring it to use. (Also I/O activity wake it.)

The plastic LCD display is light in weight and relatively immune to mechanical injury. The graphics capability is advantageous so that the display can define the keypad, key location, size, and legend. It will display icons and provide vertical and horizontal movement. The display controller can work from a page larger than can be displayed and move around in the page without rewriting the display memory. The ability to load in custom character sets lets the unit perform I/O suitable to the country in which it is used (just by downloading new software).

The I/O may be strictly serial in operation; however, besides the two UARTS of the V25 there will be an 8530 SCC (serial communication chip) which will provide two more serial channels. This enables protocols to be run synchronously as well as asynchronously. The 8530 will provide bit, byte, and A-Sync communication at a high data rate—up to 1.5 megabytes per second.

Pursuant to an early concept of peripheral shells, the unit can stand alone in a package tracking, meter reading, tree counting or warehouse/store inventory environment, but possesses a great amount of power and with more peripherals could well become the next generation of low and mid-range terminals. A shell would be used to envelope the unit and house the external peripherals and additional power source they would require. A hand-held computer unit could be composed of a keyboard and a fifteen pin I/O interface with the whole under keyboard area filled with alkaline batteries to power the peripherals and the V25 core unit.

Similarly, a larger display, a printer, a permissive modem, an RF link module and other peripherals could be shelled around the core unit of FIGS. 7, 8 and 9.

By way of example, the terminal unit of FIGS. 7, 8, and 9 may have a width of the order of two inches (e.g. 2⅛ inches), a length of the order of three inches (e.g. 3⅜ inches) and a thickness of the order of one inch (e.g. ¾ inch).

In a digitizing input mode of operation of the unit of FIGS. 7, 8 and 9, successive character entry fields may be defined in a line across a screen area such as indicated at 240. For example, the rectangle 240-1 (presently containing the numeral "1") could receive a first character, e.g. manually entered as a series of strokes by means of a stylus. The unit could produce a graphical display in the form of lines corresponding to the paths of the successive strokes, e.g. at the line 242 above line 240. The program could analyze the input on the basis of the sequence in which the strokes were entered, rates of stylus movement, and so on, so as to interpret the intended character with substantial accuracy. The unit may display its interpretation of a manual character entry by displaying the corresponding stored character from its repertory at a line 244, e.g., as soon as there is a pause of selected (programmable) duration. If then the user begins drawing a new character, e.g., in a second field 240-2, the program will assume that its interpretation is correct and will automatically store it. If a given field is skipped, a space may be correspondingly automatically stored. The size of each character field and other parameters (such as pause duration) can be selected to have values convenient to the individual user, during a mode, with suitable prompts from the display. The processor, during manual character entry, can be set to a learning mode where it seeks to adapt as accurately as possible to the writing style of a given user. Such learning mode can be switched off whenever desired, as a further user set up mode parameter. A similar procedure could be followed for processor learning in the case of a speech input module.

FIG. 10 illustrates a shell module 260 having a receptacle 261 for receiving a processor core module such as 200, FIGS. 7, 8 and 9. Module 260 may cooperate with module 200 to provide a direct store delivery terminal. The terminal may have a card slot 262 for receiving a conventional smart card containing the information related to a delivery transaction, and may have an input/output coupler such as a one-fourth inch phone jack 264 for coupling with a store device 270, FIG. 11, via a connecting link such as 272, FIG. 12. Phone jack 264, FIG. 10, and phone jack 274, FIG. 11, may be one-fourth inch three conductor phone jacks for receiving cooperating phone plugs 276, 277 of link 272.

The coupling between a smart card and a receiving terminal (such as 260, FIG. 10) is illustrated in the third figure at page 45 of an article entitled, "Smart Credit Cards: The Answer to Cashless-Shopping" in *IEEE Spectrum*, February 1984 (pages 43–49) and this article is incorporated herein by reference by way of background. A similar coupling arrangement is preferred between modules 200 and 260.

By way of example, the core module 200 may have an array of eight I/O contacts similar to those of the smart card of the third figure at page 15 of the *IEEE Spectrum* article just referred to. These contacts would mate with cooperating contacts at a contact region such as indicated at 280 of module 260. Charge and ground contacts of module 200 could be of fixed function, while the other contacts could be programmable as channels, clocked data, analog inputs or outputs, or event inputs and outputs.

Module 260 may have a battery compartment 282 for receiving alkaline batteries for energizing suitable interface circuitry such as represented in the above-referenced third figure. A telephone jack may be located at 284 for coupling with the modem of the referenced third figure. Module 200 may couple with the interface circuitry of module 250 via contact region 280 in the same way as represented in the referenced third figure for the case of "Peripherals" and/or as represented for the case of a "Display", and "Keyboard", for example. A customer keypad may be coupled with module 260 in the same way as represented in the referenced third figure.

Typical shells for forming hand-held terminals with module 200 could be printers, laser bar code readers, RF modules; smart card interfaces (as at 262, FIG. 10), disk systems, full travel keyboards, larger displays, local area network interfaces, etc. A hand-held printer device which could serve as a shell for the processor module 600 is available from NORAND Corporation, Cedar Rapids, Iowa and is referred to as a 40-column hand-held printer for use in product distribution systems, and is described in a brochure designated "960-182-0485" of Norand Data Systems.

DISCUSSION APPLICABLE TO ALL EMBODIMENTS

The concept of a plural module hand-held data processing system enables the use of a single computing engine to drive an entire product line. The basic or core module may comprise a self-contained limited input/output device with extreme reliability and flexibility. While the core module can serve many markets directly, many more can be met by using peripheral device shell modules which may integrate the core module into its confines. An internal fixed operating system protects the critical core module functions while allowing user applications to execute in a multi-tasking real time environment.

Of prime importance are the two requirements and tremendous capability. The lowest possible cost is achieved by use of technology yielding low manufacturing costs at high volumes. High volumes are achieved when a single product is flexible enough to perform well in multiple markets.

Of particular interest are flexible shirt pocket size plural module configurations which enable data input independently of a conventional keyboard. For example, a digitizer tablet input such as described with reference to FIGS. 7–12 is also applicable to the embodiments of FIGS. 1–6. Various optical type scanners are also of substantial utility for quick, easy and highly accurate input of existing printed data, e.g., bar codes, text, and graphical information. Instant type optical readers which may be integrated into a hand-held shell module according to the present invention are disclosed in a pending application of the present inventors U.S. Ser. No. 894,689 filed Aug. 8, 1986, (now U.S. Pat. No. 4,877,949 issued Oct. 31, 1989), and the disclosure including the drawings of this pending application are incorporated herein by reference in their entirety as illustrating arrangements which may be embodied in a peripheral shell such as indicated at 250 in FIG. 10. For the embodiments of the co-pending application, the optical output means may be at opposite ends of battery compartment 282, while the reflected light optics and processing components may occupy the region below compartment 282 and a region replacing card slot 262, FIG. 10. The control and processing means of said co-pending application could be embodied in the basic core module such as represented at 200, or the display and manual data input means could be provided by a separate module in receptacle 261, while a basic processing module occupied a greatly reduced space such as represented at 300, FIG. 10, the processing module being inserted into a receiving well via a removable cover as is commonly the case with battery compartments such as 282. Such a cover could incorporate resilient means so that when the cover was latched, a core processing module at location 300 would have its eight metal contacts pressed against cooperating contacts of the receiving shell module such as 260. Referring to the article "Smart Cards" by Robert McIvor in Scientific American, November, 1985, at page 153, an eight contact terminal is shown in association with a single chip microprocessor system, from which it will be apparent that the width of the smart card could be reduced from fifty-four millimeters to twenty millimeters and fit edgewise into the region 300 (vertically as viewed in FIG. 10). For such a strip type core module, the thickness could be substantially greater than the standard card thickness of 0.75 millimeters, for example ten millimeters.

The core module may incorporate the components of FIG. 1 or FIG. 6, or components such as 77, 78 and 80, FIG. 4, may be incorporated into a peripheral device module, for example one fitting into receptacle 261 of shell module 260, the core module incorporating the remaining components. Similarly as to FIG. 5, components such as 147, 148, 149, 150 and 151 can be incorporated into a module fitting into receptacle 251, while component such as 152 and 154 may be incorporated into the shell module 260, and 261 the remaining components incorporated into the strip core module fitting into region 300.

Preferred features of an exemplary core module such as might fit into receptacle 12, FIG. 1, receptacle 125, FIG. 5B, or region 300, FIG. 10, are as follows:

(1) User immune real-time multi-tasking operating system. The multi-tasking ability allows system programs of the core module to run in the background and never lose control. This ensures proper operation of the user's application(s) and system status availability.

A program known as VRTX (Versatile Real-Time Executive) and IOX (Input/Output Executive), available commercially, together with input/output drivers, monitors and control programs preferably compose the operating system stored in the core module (for example in read only memory ROM).

(2) A microcomputer compatible with personal computer architecture, e.g., an NEC V25 microcomputer with 8086 type architecture, supports the implementation of the operating system in that VRTX and IOX are 8086 oriented. A high integration CMOS construction directly supports the lower power standby and shut down features which are desired for the core module versatile interface adapter (VIA) software control. A one megabyte addressing range would be considered a minimum for hand-held units, along with a sixteen bit internal arithmetic logic unit.

(3) With a one megabyte memory, for example, read only memory necessary to contain the operating system would require about eighty kilobytes. All the rest of memory in the addressing range may be CMOS static random access memory used for applications.

(4) The core module preferably provides clock and calendar functions, and a hardware real time clock chip is compatible with very low power requirements.

(5) Battery operation is presently a key hardware aspect of a core module, and this is the main reason VRTX should provide immunity from the user. In order to offer unparalleled reliability in the field, the power control system should never be tampered with except under operating system control. The core module may use nickel cadmium rechargeable batteries. Such a core module preferably implements the intelligent battery system such as disclosed in U.S. Pat. Nos. 4,455,523; 4,553,081, and in a pending application of Steven E. Koenck, et al., U.S. Ser. No. 876,194, filed Jun. 19, 1986, now U.S. Pat. No. 4,709,202. The intelligent battery system allows a very accurate "fuel gauge" for advising the user of remaining battery capacity. Fast charge capability offsets the lower capacity batteries which are preferably used in the core module. All of the RAM, the RTC and internal registers, e.g., of the V25 are battery backed up, even with the unit shut down.

Battery monitoring will also indicate possible problems before they become serious and, combined with other system monitoring, will provide unprecedented forewarning of possible impending failure. All devices will ultimately fail, but it is extremely advantageous if a unit can be removed from service before a hard failure occurs.

(6) The core module should be able to communicate with a host and with peripheral devices, for downloading of the application programs into the core module and for communicating with all types of input/output devices such as those referred to herein. Extensive flexibility in the communication protocol is provided for example by using two high speed serial channels capable of being programmed as asynchronous, byte synchronous or bit synchronous. Eight input/output contacts provide electrical connection to the outside. The charge and ground contacts may be fixed while the other contacts may be programmable as serial channels, clocked data channels, analog inputs or outputs, or event inputs and outputs. The concept of using peripheral shell modules for selective coupling with the core module offers complete expansion capability with minimal development time to enter new markets. Typical shell modules could comprise graphics LCD display means providing a touch keyboard, digitizer tablet means, printers, laser bar code readers, RF modules, smart card interfaces, disk systems, full travel keyboards, larger displays, local area network interfaces, et cetera. Optionally, as illustrated in FIGS. 7, 8 and 9, for example, the core module may have a built-in minimal input/output capability such as may be achieved by using a graphics LCD display on one face of the core module for output and a touch responsive keyboard directly behind and defined by the display. The display, for example, may comprise 64×128 pixels, or eight lines by twenty-one characters, and may support any character set that can be defined. This is ideal for foreign applications. Since the keyboard is defined by the display, it will naturally be in the same language. The display (and keyboard) may be back lighted by a built-in electro-luminescent panel. Many stand-alone applications for such a core module would require bar code scanning and thus a built-in scanner is illustrated at 212, 214, FIG. 7. Such a display would have the ability to use icons (pictorial images) as labels for keyboard locations, and to change them as the application requires.

A core module such as shown in FIGS. 7 and 8 could have a housing comprised of two die cast magnesium shells, glued together. Preferably there are no holes through the housing, so that the unit is submergible. It is ideal for meter reading, package tracking, timber inventory, or environmentally demanding application. Internal construction is preferably of one continuous flexible printed circuit board. This eliminates connectors, weight, and sources of failure. Preferably even the batteries are soldered in. The core module may withstand being dropped to a concrete surface from seven feet without functional damage. A minimum number of integrated circuits will reduce the cost and increase the reliability of the core module.

Where the graphics type keyboard displays icons representing physical objects, it will be apparent that such physical objects may be represented by a single code word such as utilized to represent any other keyboard entry. Such code may be translated into a corresponding graphical icon type display by means of a suitable read only memory or the like. A similar situation can prevail for example where shorthand characters are input to respective receiving regions such as indicated at 240-1 and 240-2 in FIG. 9. Spoken words related to a given application may likewise be represented by single code words in random access memory, and translated via read only memory or the like into corresponding strings of characters for display, or for synthesized speech output. As previously mentioned, if the letter P is related to a number of objects for a given user application, the user may input the letter "P" at a region such as 240-1 or 240-2, FIG. 9, whereupon the input strokes may be repeated at a corresponding location in row 242, and possible interpretations, either graphically, or as character strings, may be sequentially presented, e.g. at row 244. When the correct interpretation is displayed, the user may touch a suitable region of the display such as indicated at 310 to indicate approval of the current displayed interpretation.

In preferred hardware for implementing the illustrated embodiments, all memory and input/output accesses are allowed when the system is in the supervisor or system mode. On the other hand, any access by an application program to any area outside of its work and program areas (as assigned by the system) must immediately return control to the operating system for proper action. A microcomputer such as the V25 is advantageous because of its non-multiplexed bus, and built-in software controlled power down. It would also be advantageous to have a built in hardware boundary checking of applications being run (as in the 80286). A digital semi-custom chip can accommodate this function externally.

A V25 internal timer may be used as the VRTX tick. Entrance to VRTX is through the NMI input of the V25. This is the only input (besides reset) that not only can wake the chip up if its in a sleep mode, but also cannot be shut off by an application (thus disabling VRTX). Many sources may logically OR into NMI. The real-time clock, serial channels, charge indicator, and keyboard are some of these. Most of these should be programmable as to whether they can activate NMI.

The random access memory can be built as a separate module. For example eight 128 kilobyte chips and decoding may be in the module. A module select line should also be included since the module is expected to be useful in other product lines in multiple configurations. Standby currents of fifteen microamperes at two volts are being presently considered.

As real-time clock, an Intersil 7170 may be used since it is guaranteed to operate at two volts, the same as for RAM. The RTC and RAM are all battery backed up once low battery condition is entered.

For a shell module containing a display, a plastic LCD dot matrix display from Polaroid Corporation may be used. A display size of 64×128 pixels with eighteen mil pitch gives eight lines of twenty-one characters each (5×7 font). The controller may be the Epson E-1330. This is a graphics controller that can support three separate planes or pages for the screen and can combine them in many different ways. The planes can be graphic or characters. The characters can come from the internal ROM or RAM loaded by the application. A graphics plane could create boxes and a character plane could put legends in them. The E-1330 uses S-MOS 1180 and 1190 drivers to run the columns and rows (respectively) of the display. They apply a ten to fifteen volt bias on the display. This may be obtained from a plus five volt supply in the core module in combination with a variable minus twelve volt supply in the shell module and providing two to three milliamperes for the display. This supply is controlled by the E-1330 as for on-off but the V25 will be responsible for controlling the actually used voltage based on the temperature of the core module and user input information. A fast recovery crystal is preferred to minimize the time delay upon release of pressure (e.g. by the manual entry stylus or finger). Using a fast recovery plastic LCD display enables the user to press through the display and activate a keyboard behind it. The display is used to define the keyboard or provide the "overlay". This gives the advantage of not only being able to continually change the keyboard as the application requires, but if the display is programmed in a foreign language such as Ethiopian, the keyboard is in the same language. Putting the keyboard behind the display allows for an opaque design of low contact resistance. The keyboard may be a 5×10 matrix (fifty keys) software configurable to be combined for any shape or icon style key defined by the display.

A soft (but tough) electro-luminescent panel is preferred for back lighting, the keyboard being activated by pressing through the display and the electro-luminescent panel. A tremendous advantage here is that not only is the display operable at night, but so is the keyboard (which is further programmable).

A built-in wand scanner such as indicated in FIG. 7 preferably has a sapphire lens in a stainless steel or other hard metallic housing. Testing has shown that sapphire tipped wands will chip concrete before they break. It is preferable to make the chip very rugged rather than to make it easily replaceable. The wand housing is preferably clamped (and glued) right into a casing such as 201. The light source may be a near infrared visible LED to be able to read non-carbon inks and let the user know it is on, yet take advantage of the infrared capacity to read through many stains and smudges. Preferably the scanner is capable of reading in direct sunlight, and in this connection reference may be made to an application of Eric J. Danstrom, U.S. Ser. No. 044,820 filed Apr. 30, 1987 (abandoned in favor of U.S. Ser. No. 07/257,106, now U.S. Pat. No. 4,970,379 issued Nov. 13, 1990), the disclosure including the drawings of which being incorporated herein by reference in its entirety.

An initial approach of a four N-cell nickel cadmium battery pack with each cell treated individually is now less preferred than a one cell "battery pack". The one cell pack requires a converter to boost the voltage. The single cell has many more advantages. No cell matching is required. No conditioning cycles are required, and it is not necessary to be concerned about cell voltage depression. A single converter to step up the voltage for a shell display module would be suitable, with a single switching regulator (current mode) to charge the cell from a much wider input range (e.g. from four to twenty volts). Fast charging on the order of 1C (or perhaps 2C) can be achieved since continuous monitoring of cell voltage and temperature curves (with respect to previous cell conditions will allow proper charging with no risk of overcharge, This same monitoring applied to discharge as well, provides a very accurate "fuel gauge". Rechargeable lithium batteries may be considered, but the general recommended operating requirements do not match the preferred embodiment as described herein as well as nickel cadmium batteries. The charging line will have a diode blocking reverse current flow and inserted prior to the input/output terminal (for protection). This same single battery pack may also serve as the backup battery. The operating system may operate to equate ten percent or twenty percent of remaining capacity in the battery pack to "zero" on the "fuel gauge" being displayed to the user.

In a preferred embodiment a surface type connector as used in smart cards has advantages in that it takes up very little space and cannot clog with dirt (can be wiped clean, e.g., during interconnecting of respective modules). Further, a surface type connector avoids the use of a cable. To maintain input/output protection and immunity from the environment, each core module may have all of its programmable input/output terminals disabled. The charge pin of a core module may be used to determine the presence of a peripheral shell. Each peripheral may have its own power supply and may or may not provide charge to the core. A peripheral module must at least provide a logic ONE (greater than one volt) to the charge pin in order to signal its presence. If such a logic ONE is present, the core module will determine if the peripheral module can charge it by enabling the charge regulator on the charge pin. If the level pulls low, it will indicate that the peripheral module is meant to only communicate with the core module but not charge it.

Preferably immediately inside of the case of a module will be an electrostatic discharge (ESI)) resistor/diode clamp protection scheme. From there the I/O lines may go to a cross-point type multi-plexing circuit. Since in a preferred embodiment any of the six remaining pins can be inputs or outputs and connect to A/D channels in the module, voltage measurements could be made in a peripheral, e.g., by the core module and appropriate messages displayed to the user as to peripheral readiness and power levels.

The eight contacts of each module could be gold plated or the like such that they would be very conductive and yet tough. The contacts may be molded in a plastic insert that is glued into a hole at a location such as indicated at 280, FIG. 10, for example.

A case such as indicated at 201 in FIG. 7 can be in two pieces a front half and a back half, and the back half may have one rectangular flanged hole in which to glue the oppositely flanged I/O contact plate. The back half may be glued with conductive epoxy glue to the top case half. The top case half may have a large rectangular opening in which the display/electro-luminescent panel/keyboard assembly fits. There may be a shelf behind this assembly for support with a glued-in bezel to seal the display and other components into the depression.

In an embodiment such as FIG. 7, preferably the mating corner portions of both halves may be specially molded to clamp around the scanner housing. When finally glued together, the resulting casing 201 may be completely sealed. It may be water and gas tight, but preferably not hermetically sealed where the display plastic is permeable. Purging the casing such as 201 with dry nitrogen at the time of assembly and sealing may increase reliability. Operation may be from somewhat below sea level (e.g. actually under water) up to 10,000 feet. The case such as 201 may have a size a little over three inches long by a little over two inches deep by about three-fourths inch thick, for example.

A module such as indicated in FIGS. 7, 8 and 9, would be suitable by itself for fields such as package tracking, price checking, inventory control, meter reading, consumer comparative shopping, et cetera. Various countries may require individually designed modules to couple with the module or module assembly of FIGS. 7, 8 and 9, in order to meet national requirements and the like, e.g, with respect to such peripheral devices as modems, power supplies and so on.

The core module previously referred to as being insertable into a space such as 300, FIG. 10, may also be insertable into a similar space in the module of FIGS. 7, 8 and 9, and may represent a standardized basic processing module having the real-time multi-tasking operating system and other characteristics previously described herein.

It will be apparent that many modifications and variations may be effected without departing from the scope of the teachings of the present disclosure. For example, scanner tips such as indicated at 60, FIG. 2, or at 214, FIG. 7, may be adapted to left-handed users, by inverting the contents of the display. Thus if tip 214, FIG. 9, would be at the lower left with an upright display as shown in FIG. 9 for right-handed manual data entry, the module 200 might be turned by a left-handed user so that the tip 211 was at the upper right, and the contents of the display inverted.

DIGITAL SIGNAL PROCESSING (FIGS. 13A, 13B and 14–18)

Reference is made pursuant to 35 U.S.C. Section 120 to Arvin D. Danielson and Dennis A. Durbin co-pending application for patent U.S. Ser. No. 894,689 filed Aug. 8, 1986 (now U.S. Pat. No. 4,877,949 issued Oct. 31, 1989), Attorney's Docket No. 5740, and the disclosure of the specification including the claims, and of the drawings of said co-pending application is hereby incorporated herein by reference.

A module such as shown in FIGS. 7, 8 and 9 may have a non-contact essentially instantaneous bar code scanner, e.g., at a long edge such as 311. Flash illumination where needed for the instantaneous bar code reader could be provided by a receiving shell such as shown in FIG. 10. The shell could contain the battery power for the flash illumination means in the shell and also for any LED marker light sources associated with the photodiode array of the processor module. A series of light emitting diodes could be used for each of the flash illumination sources of the second and third figures of the incorporated patent application Ser. No. 894,689 (now U.S. Pat. No. 4,877,949), and such LEDs could all be energized with simultaneous electric pulses, or the pulses could be supplied in quick succession to essentially simulate an instantaneous flash. Where the long edge 311, FIG. 7, contains the scanner window for receiving a reflected bar code image, the receptacle 261 could be shaped so that edge 311 would face frontally, and a frontal face such as 312, FIG. 10, but of a greater dimension would contain the flashable light source means, for example. The processor module and shell when assembled would be hand held in operation, and could be of overall size to fit in a shirt pocket.

The present invention is particularly concerned with improvements in instant bar code readers of the type shown in U.S. Pat. Nos. 4,282,425 and 4,570,057. The disclosures of these U.S. patents are incorporated herein by reference by way of background.

The instantaneous type of bar code reader with flashable illuminator means has proved to be extremely desirable for portable applications because of its unique simplicity and compact design. A significant goal of the present invention is to retain the major advantages of the present commercial instant bar code readers with flashable illuminator means while enhancing the capacity for reading bar codes of substantially greater length. An important related aspect of the invention is to enable the reading of such large labels by illuminating the same with an instantaneous flash of light while the labels are at a greater distance from the frontal end of the reader. A further development goal is to more effectively adapt the reading operation both to close up bar code labels of high reflectivity and to labels at greater distances and of curved configuration. It is also conceived that a major improvement is possible in the processing of bar code signals however generated.

In FIGS. 13A and 13B, the output level indicated at 321a, 321b may represent the output from the image sensor in the absence of light, while reference lines 322a, 322b and 323a, 323b, may represent the output level from the image sensor for the case of a black label of a specific uniform reflectivity and of a white label of a specific uniform reflectivity. The non-uniformity of the signal level over the length of a bar code is a result of the non-uniformity of the illumination of the bar code, and/or of the curvature of the bar code. The characteristics shown in FIGS. 13A and 13B apply generally to bar code reader systems where illumination is non-uniform or where the label is curved, and are not limited to flash illumination systems.

In accordance with the present embodiment, it is conceived that digital signal processing of a bar code signal before the normal decoding algorithms are applied can greatly increase the read rate and general readability demonstrated by a scanner. By way of example, the output waveforms 325 and 326 of FIGS. 13A and 13B may represent the image sensor output of instant bar code readers such as shown in U.S. Pat. Nos. 4,282,425 and 4,570,057. As shown, the sensor output is smaller at both ends of a label than in the center. The main reason for this is the fall off of illumination at the ends according to the function $1/r^2$ where r is the radius from the effective point source at an end of the bar code. At the central portion of the bar code label, the corresponding function is $1/r$ due to an effective line source of illumination of the bar code at the center. This effect is multiplied when reading labels curved around cans and bottles where the label towards its ends is progressively farther away from the reader.

An image sensor has the advantage that it establishes an absolute dark signal as indicated at 331, FIG. 13A, and at 332, FIG. 13B, at the beginning of each reading operation. This allows the reader electronics the ability to always properly set up for detecting all bars and spaces of a label. A commercial instant bar code reader of the type shown in U.S. Pat. Nos. 4,282,425 and 4,570,057 uses this feature but incorporates a peak detector hardware circuit that digitizes the analog CCD output based on detecting peaks and comparing them with a fixed hysteresis to determine where a bar or space transition is located. This allows what is called first bar stretch if the hysteresis is too small and missed bars or spaces if the hysteresis is too large. The varying intensity pattern of the CCD output as illustrated in FIGS. 13A and 13B, when a single hysteresis value is used, contributes to radiometric errors in the width counts of bars and spaces and makes it more difficult for the decoding algorithms to function in an optimum manner. The algorithms are designed to overcome only a fixed amount of variation. Most readers set up to detect a first black bar on white background as in FIG. 13A, will miss the first bar for the case of a white bar on a black background as represented for example in FIG. 13B, while those set up to detect the first white bar for the case of FIG. 13B will tend to insert a bar when reading a label such as represented in FIG. 13A. Digital signal processing according to the present embodiment will result in proper detection of a first black bar on a white background as illustrated in FIG. 13A and will not insert bars or spaces in the case of either FIG. 13A or FIG. 13B.

By storing each sample in digital form until no longer needed, the successive pixels of the stored signal can be examined so as to greatly enhance the sensitivity and accuracy of the bar code reading process. In a preferred embodiment, the first pixels supplied by the CCD shift registers give absolute dark values such as indicated at 331 and 332. The corresponding stored pixel values provide a valid reference level from which to examine pixels of the bar code signal as digitally stored. As illustrated in FIGS. 13A and 13B, all bar codes will produce a negatively sloped signal in the vicinity of the first bar.

In one example of a signal processing procedure for processing the bar code signals resulting from scanning black bars on a white background and white bars on a black background, each signal is examined first to locate a slope reversal such as indicated at 341, FIG. 13A, or 342, FIG. 13B.

In a preferred embodiment, the criteria for a slope reversal is not only a change from negative slope to positive slope (or vice versa) but also a requirement that the changed slope extend for a specified amplitude range. This requirement is described as a need to meet a minimum "hysteresis level" once slope has changed (using a concept derived from the "hysteresis" effect where the output is made dependent on the direction of the input current traverse in certain electrical devices, e.g., in comparator type switching circuits where it is desired to avoid repeated cycling due to noise pulses). For example, in a preferred embodiment, a change from negative slope to positive slope in an initial part of a bar code, following a reference level such as indicated at 331, FIG.

13A, or 332, FIG. 13B, would require a signal amplitude increase as measured directly at the output A/D3 or A/D4 of the CCD array of sixty millivolts. Thus, if the amplitude increase from 341 to 351 in FIG. 13A is sixty millivolts or more, a first slope transition would be recognized at 341 for the purpose of further processing steps herein. Similarly, in FIG. 13B, the transition from 342 to 352 would need to have an amplitude of at least sixty millivolts to have transition point 342 recognized as the first slope transition for purposes of the further processing steps. In examining the bar code signals for further slope transitions, as the signal increases in magnitude as the center of a bar code is approached, the required amplitude change or hysteresis value can be adjusted to correspondingly larger magnitudes to reduce the risk of error due to signal noise or label aberrations. The various hysteresis values can be software selected, and thus readily modified to adapt the processing to special labels or situations.

Once a first slope reversal is found as at 341, FIGS. 13A, or at 342, FIGS. 13B, the processor means may be programmed to examine succeeding pixels of the stored signal to locate a slope transition of opposite type, e.g., as indicated at 351, FIGS. 13A, or at 13B.

As previously explained, a slope transition is accepted for processing purposes if the signal level beyond the possible slope transition changes by a selectable value. Where the peaks 351 and 352 meet this criterion, the signal between peaks 341 and 351, and between peaks 342 and 352 is examined to establish a suitable reference point for measuring bar width.

Figure 14:
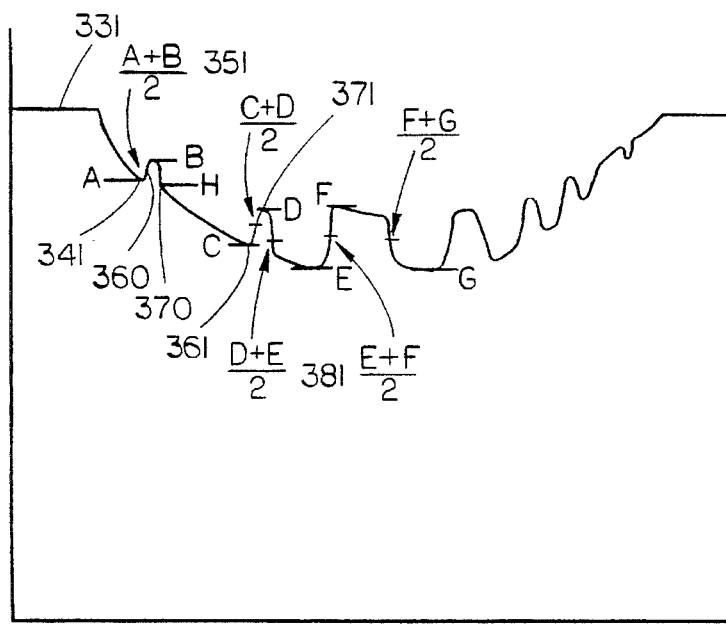
FIGS. 14, 15, 16 and 17 are plots of bar code signal variation in the vicinity of a first bar, FIG. 14 showing a plot for a narrow first black bar on a white background, FIG. 15 showing the case of a narrow first white bar on a black background, FIG. 16 showing the variation for a wide first white bar, and FIG. 17 showing the case of black bars on a low contrast highly reflective white background.

For the case of dark bars on a light label, the problem is better understood by reference to FIG. 14. If a first valid slope transition has a signal level A and a second valid slope transition has a signal level B, the measurement of the width of the first dark bar should be taken from a transition point 360, FIG. 14, which is midway between the signal levels A and B, i.e., at (A+B)/2. On the other hand for a following stored signal pattern between valid slope reversals at signal levels of B and C, a midpoint between levels B and C would not properly represent the point for measurement of the width of the first dark bar. The correct transition point is actually at a signal level of H. Thus, in order to identify the proper transition points for measurement of bar width, according to the procedure of the present invention, the maximum slope of the bar code signal between valid slope transitions is also taken into account.

In a preferred embodiment, a transition for purposes of measurement of bar width is taken as the maximum slope section of the signal closest to the midpoint between the signal levels of two successive valid slope reversals of opposite type. Utilizing this preferred criterion, the transitions in FIG. 14 for bar width measurement are (A+B)/2, H, (C+D)/2, (D+E)/2, (E+F)/2 and (F+G)/2.

Thus, in analyzing a stored signal pattern as represented in FIG. 14, the processor would proceed from the reference absolute dark level 331, and locate the slope transition from negative slope to positive slope at 341. The processor would then analyze the signal levels beyond point 341 to determine if the transition at 341 was to be regarded as a valid transition. For example, if the differential between levels A and B corresponded to sixty millivolts of signal amplitude as measured directly from the output of the CCD array, the peak at 341 would be treated as a valid slope reversal for purposes of locating the measurement point 360.

In preparing signal data for processing, a filtering algorithm may be applied such that the stored and filtered data to be analyzed would plot as shown in FIGS. 13A, 13B and 14 without high frequency superimposed noise disturbances. In this case, the processor can simply identify peaks such as 341, 351 and 361 by their respective slope transitions and obtain the difference between levels B and C to determine if slope transitions 341 and 351 are to be considered valid. If the level B minus level A value does not meet the initial hysteresis criterion, then slope reversals 341 and 351 would be ignored, and slope transition 361 would be analyzed based on the required initial hysteresis value between levels C and D.

If the slope transition at 351 was such that the differential between levels C and B did not meet the hysteresis criterion, then slope transitions 351 and 361 would be ignored, and a further positive slope to negative slope transition, e.g., at 371 would be examined with respect to the required hysteresis criterion.

Once the first two bar width measurement points such as 360 and 370, FIG. 14, have been determined, the pixel count value between these measurement points is computed as a measure of the width of a first dark bar. Such processing steps can proceed as background while further portions of the bar code signal are being read and converted to digital form.

Figure 15:
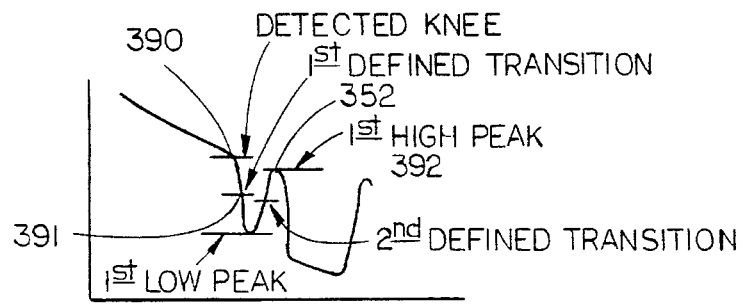

When the predetermined number of pixels available from the photosensor 11, e.g., 5000 pixels, has been read into the processor, the read in process is complete, and processor 10 completes the bar code evaluation as promptly as possible.

Where a single processor program is to handle the analysis of both black bars on a white background and white bars on a black background, the program must analyze the signal region prior to the first valid negative to positive slope transition or first low peak for a knee such as indicated at 390, FIG. 13B. As indicated in FIG. 15, the width of the first white bar is then to be measured between points such as 391 and 392, FIG. 15. In other words, while the transition as at 360, FIG. 14, from a white space to a first black bar occurs after the first negative slope to positive slope transition, for the case of the transition from a black space to a first white bar, the transition occurs as shown at 391, FIG. 15, prior to the first negative slope to positive slope transition.

Figure 16:
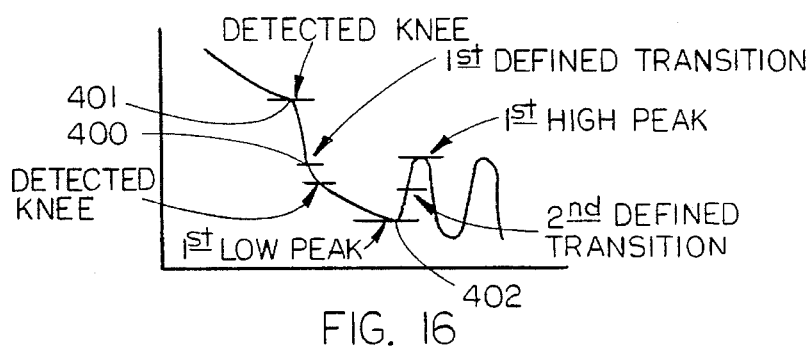

FIG. 16 is similar to FIG. 15 but illustrates the situation where the first white bar is much wider, and the black background to white bar transition occurs at a point such as indicated at 400 between a knee 401 and negative slope to positive slope transition at 402.

In order to examine the portion of a bar code signal prior to a first slope transition for a knee such as indicated at 390, FIGS. 13B and 15, or as indicated at 401, FIG. 16, the program analyzes the slope of the bar code signal at the beginning and working toward the first slope reversal.

First an initial slope is established based on the first few pixel measurements beyond the absolute dark reference portion (such as 331, FIG. 13A, or 332, FIG. 13B). Then the processor looks for an abrupt slope change in the negative direction relative to such initial slope of at least two to one. For example, if the initial slope was minus forty millivolts per pixel, then an abrupt change to at least minus eighty millivolts per pixel would be required to qualify as a valid knee prior to the first negative to positive slope transition. The slope value for comparison purposes is adjusted from the initial value after each determination of a gradual slope change so that gradual slope changes over a number of pixels will not cause a false indication of a knee transition. If no sufficiently abrupt transition in negative slope is found, it may be assumed that the first space to bar transition is located after the first negative slope to positive slope transition (as in FIG. 13A).

If a sufficiently abrupt change in negative slope is found, the program may treat such knee-like transition as a first slope transition, and then proceed the same as for the case of FIGS. 13A and 14.

By way of example, if the processor is to establish a list of valid slope transitions and has entered the pixel address of slope transition 342, FIG. 13B, as a first negative to positive slope transition, the processor may shift such pixel address to a location for a second slope transition, and enter the pixel address of transition 390, FIG. 13B, as the first slope transition. Having then established two valid slope transitions, the processor can subtract the respective signal level values from each other and divide by two to identify the level midpoint. If the processor has previously established a list of slope values for pixel addresses between points 390 and 342, the processor can examine the list to identify the maximum slope value. If several slope values close to the maximum slope are present, the processor selects the one closest to the level midpoint. For example, slope values within ten percent of the greatest slope value within an interval under consideration may all be considered as maxima for the purpose of selecting the maximum slope closest to the level midpoint, especially where individual pixel readings are subject to errors of this magnitude.

Figure 17:
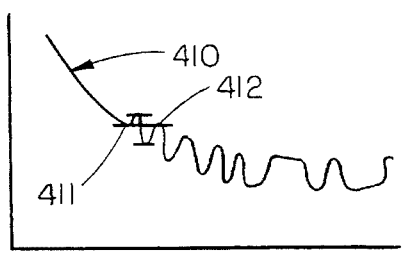

FIG. 17 illustrates the signal variation 410 for the case of black bars on a white background where the label is of low contrast and highly reflective. As indicated, a first low peak 411 may actually have a magnitude equal or greater than the second high peak 412, thus emphasizing the importance of controlling the processor to adaptively examine successive portions of the bar code signal as taught in reference to FIGS. 13A, 13B, 15 and 16. By controlling the processor to examine each transition with respect to its own peaks and slopes, it is possible to validly decode a bar code signal which could not be otherwise analyzed.

As with all signals, there is noise to be accounted for, and the processor is controlled to maintain a minimum hysteresis for all values and to average multiple pixels for determining slopes. The number of pixels to be averaged and the minimum hysteresis to be used in the control of the processor can be software selected, and thus can be modified to adapt the processing to special labels or situations.

Figure 18:
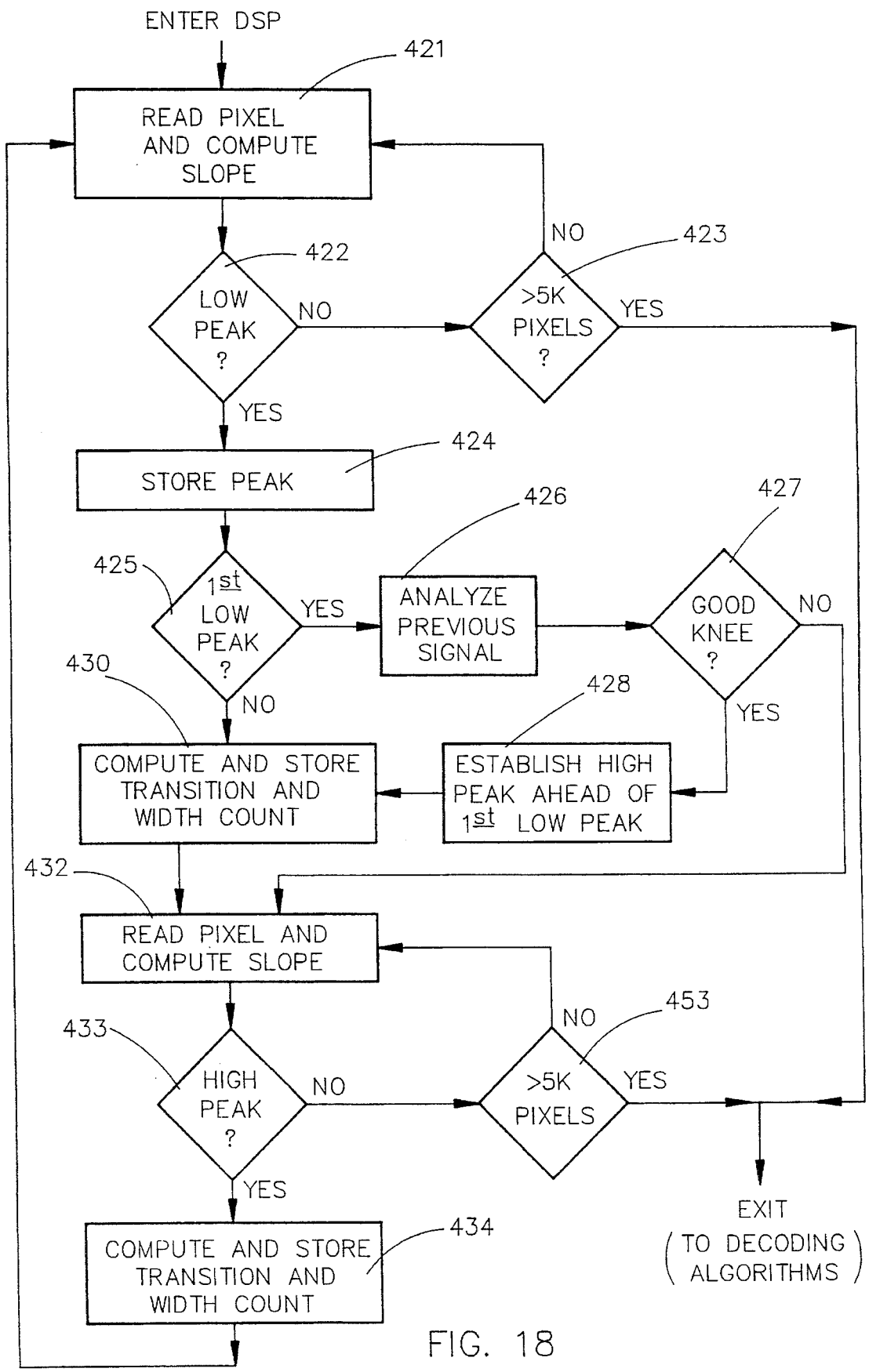
FIG. 18 is a flow diagram useful for explaining the processing of bar code signals such as shown in FIGS. 13A, 13B, and 14, 15, 16 and 17.

FIG. 18 illustrates an exemplary control program for the processing means 10 of FIG. 1 in implementing the analysis of bar code signals such as represented in FIGS. 13A and 13B which have been stored pixel by pixel in digital form. In digital signal processing mode, the processing means is controlled to read successive pixels so as to compute a slope value for a given pixel based on suitable average values. For the successive slope values as computed in step 421, the slopes are compared to identify a transition from a negative slope to positive slope as a "low peak". If such a transition is not found in step 422, decision step 423 is executed normally with a return to processing step 421 and the reading of a further pixel value and the computation of an associated average slope value. When a low peak such as 341, FIG. 14A, 342, FIG. 14B, or 402, FIG. 16, is located, the signal value associated with this low peak is stored as indicated by processing step 424. As represented by decision step 425, if this is the first low peak, then processing as indicated by step 426 takes place to examine the stored pixels in the region between the absolute dark signal portion 331, FIG. 13A, or 332, FIG. 13B, and such first low peak. If a valid detected knee is found such as indicated at 390, FIGS. 13B and 15, or at 401, FIG. 16, then according to step 427, such valid detected knee is established as a first high peak value for the purpose of further processing as shown by step 428. Processing then proceeds according to step 430 with a computation of the first defined transition point such as indicated at 360, FIG. 13A, 391, FIG. 15, or 400, FIG. 16.

If decision step 427 failed to locate a "detected knee" before the first low peak, then the example of FIG. 13A would apply and processing would proceed directly to step 432. According to step 430, the pixel number associated with the transition 391 or 400 could be stored in a memory associated with processing means 10.

For the case of FIG. 13A, a high peak such as 351 would be identified by processing step 433 and the associated transition 360 would be determined by step 434, the processor storing the pixel number associated with the transition 360 in memory, and then proceeding to examine the stored signal according to processing step 421. A similar processing at steps 433 and 434 would detect the first high peak 352 and second defined transition 392, FIG. 15, and the first high peak 450 and second defined transition 451 for the case of FIG. 15. With the computation of the second transition in step 434, the processor would compute the bar code width as the difference between the pixel number of the second defined transition 392 or 451 and the first defined transition 391 or 400, and store such difference as the width count for the first white bar.

In either event, processing would terminate as represented by decision block 423 or 453 after all of the pixels of the bar code signal had been examined.

It would be feasible to utilize the early decoding of initial bars of a bar code signal in order to speed up auto discrimination, e.g., the automatic decision by the processor as to whether a bar code is being read from a white or black background.

It will be apparent that many further modifications and variations may be effected without departing from the teachings and concepts of the present disclosure.

SUPPLEMENTARY DISCUSSION RE FIGS. 7 THROUGH 12

The following gives examples pursuant to FIGS. 7 through 12 where the assembled plural module device has overall size so as to readily be carried in a shirt pocket when not in use.

EXAMPLE I

In this Example I, the computerized processing module 200 of FIGS. 7, 8 and 9 has a width of 2⅛ inches, a length of 3⅜ inches and a maximum thickness of ¾ inch. The scanner tip 214 may lie essentially within the foregoing dimensions as in FIG. 7.

The receptacle 261 of the peripheral shell module 260, FIG. 10, may have a uniform width so as to snugly receive the width dimension of the processing module 200 and a length dimension such that the module 200 is substantially contained within the receptacle 261 while the portion with scanner tip 214 projects a sufficient distance beyond edge 312 for convenient scanning of bar codes while it is assembled with the shell module 260. A ledge (not shown) may extend about the margin of the recess 261 so as to overlie a top margin of the casing 201 at regions such as 201*a*, 201*b* and 201*c*, FIG. 7, while leaving the region of membrane 202, FIG. 7, accessible to the user and leaving the display region of display 204 visible through the membrane 202 as in FIG. 9.

With such an arrangement the assembled parts 260 and 200 may have an overall length of five inches or less, and a uniform overall cross sectional perimeter of less than eight inches.

In this Example I, a smart card would be inserted lengthwise into a slot such as 262 which slot would have a width of about 2⅛ inches, but such slot would be at the opposite side of the assembly from scanner tip 214 since the smart card would project a substantial distance from the assembly even when fully inserted into the slot, e.g. to a depth of two inches.

Example I may include all of the electrical and mechanical auxiliary means referred to herein with respect to FIGS. 7 through 12, and may include a smart card interface for reading and modifying transaction data stored on a smart card, and for effecting display of stored data from the smart card on the display of processor module 200, and for modifying data stored on the smart card according to data and instructions entered via the input/output means of processing module 200.

EXAMPLE II

In this Example II, the computerized processing module 200 may have the same length and width dimensions as described for Example I, but may be inserted into recess 261 of the peripheral shell module 260 in a width-wise manner, the sides of recess 261 being separated by a uniform distance of about 3⅜ inches, and such sides having longitudinal dimensions of less than 2⅛ inches so that the long edge 311, FIG. 7, of the processing module 200 would be at the rear of recess 261 adjacent battery compartment 282, and the scanner tip 214 would project beyond frontal face 312, FIG. 10, for convenient contact with bar codes to be scanned.

In Example II, the smart card slot 262 would again accommodate a smart card width of about 2⅛ inches, but the depth could be such as to receive the entire length of the smart card (if a suitable card ejection mechanism were provided).

With such an arrangement of parts and with such a modified peripheral shell configuration, location 300, FIG. 10, might be at the bottom of a shirt pocket and slot 262 at the top of the shirt pocket, with the overall length less than five inches. With the overall dimension of the assembled modules between scanner tip 214 and the external wall of battery compartment 282 being about 3½ inches, the overall thickness could be about ½ inch, so that processing module 200 would be substantially thinner than ¾ inch, for the case of a cross sectional perimeter of about eight inches (shirt pocket size). By way of example, a thin processing module 200 could receive its display and digitizer operating power from the shell module batteries at 282, FIG. 10.

Example II may include all of the electrical and mechanical auxiliary means referred to herein with respect to FIGS. 7 through 12, and may include a smart card interface as described for Example I as an auxiliary means of the processor module means for executing an auxiliary function, e.g., reading/writing with respect to a smart card in slot 262, FIG. 10.

EXAMPLE III

For a configuration according to Example I or Example II, the display of FIG. 9 would still be visible with parts 200 and 260 assembled.

With the particular screen of FIG. 9 being displayed, touching any part of region 230 could place the system in touch screen data entry mode with a desired touch type keyboard or graphics display occupying the entire length of the display area over multiple lines, for example. Touching any part of the symbol 450, FIG. 9, on the other hand could place the entire display area in digitizer mode, e.g. using a digitizer stylus of suitable construction. For the digitizer example previously given with respect to FIG. 9, outlines of entry fields such as 240-1 and 240-2 of suitable size could extend across the entire display region; and lines of characters such as generated at 240, 242 and 244 would correspondingly be able to extend across the entire display area in digitizer data entry mode.

EXAMPLE IV

The computerized processing module such as 200, FIGS. 7, 8 and 9, and such as 300, FIG. 10, for any of Examples I, II, or III may be of standardized construction, even where the shell module means have different configurations as in Examples I and II.

As previously described in detail, the computerized processing module 200 may be self-contained and may have a display screen occupying substantially an entire broad side of the unit, as is shown in FIG. 9. Input information, e.g. applied to a touch input region 230, FIG. 9, may be displayed over the surface of the display screen e.g. in five or more lines to the right of region 230. In the stylus input mode as depicted by the graphical symbol 450, FIG. 9, the unit registers the path of movement of the manually held stylus e.g. at successive fields such as 240-1, 240-2, FIG. 9, along one or more lines e.g. as at 240, FIG. 9, extending substantially completely across the screen and of length comparable to the maximum length of the unit.

EXAMPLES I THROUGH IV

The computerized processing module 200 in each example provides highly versatile and compact input/output means adaptable to graphical display of any desired patterns, facilitating utilization of the standardized module for different applications, and on the basis of the languages or graphical symbols required for marketing of the unit in any desired locality worldwide.

The term "pocket size" as used herein refers to a device with overall dimensions so as to be carried in a shirt pocket. A shirt pocket is here taken as having a size of about four inches wide by five inches high; thus a device of overall size to readily fit in a shirt pocket would have a maximum cross sectional perimeter of about two shirt pocket widths (2×4 inches) or about eight inches. A device with maximum height of about five inches would fit inside a shirt pocket while a height of about seven inches might be carried safely in a shirt pocket.

EXAMPLE V

As Example V, any of the embodiments of the foregoing Examples may utilize a digitizer screen, e.g., operating on a sonic principle with a sound transmitter located in the stylus and two receivers located some distance apart along each screen axis such that the differences in the x and y coordinates can be calculated. To digitize successive points, the stylus can be activated automatically to transmit sound pulses at time intervals such that the set of position readings for each point is readily segregated and processed, and desired resolution is obtained.

The digitizer screen may be part of a peripheral shell such as 260, FIG. 10, e.g., fitting in a receiving recess 261 and retained by any suitable means, or the digitizer screen may be provided by membrane 202 itself, FIGS. 7, 8 and 9, and thus be part of a standardized computerized processing module.

In each case, the digitizer screen preferably occupies substantially the entire area of a broad side of the shell module such as 260 or of the standard processor module such as 200. The digitizer screen preferably has a size such as two inches by three inches when part of a processor module, but may have a size of e.g. approaching four inches by six inches for the case of a shirt pocket size shell module with a standardized processor module such as indicated at 300, FIG. 10.

EXAMPLE VI

This example may correspond with Example V but the digitizer may operate on an optical principle such as described in U.S. Pat. No. 3,764,813 wherein a passive stylus may be utilized.

Again, the digitizer screen may be part of a peripheral shell device such as 260, FIG. 10, or may be formed by membrane 202, FIG. 7, 8 and 9 of a standardized computerized processing module. The dimensions of the digitizer screen may be as in Example V.

DESCRIPTION OF FIGS. 19 TO 23

FIGS. 19 to 23 show a signature pad module with dimensions of 2.870 inches (length), 1.5000 inches (width) and 2.27 inches (height). Accordingly such a module may be adapted to fit in a pocket size shell configuration such as shown in FIG. 10, to form a self contained portable battery operated system. The following description is considered relevant in explaining further the significance of the graphical input capability of the pocket size systems of FIGS. 7 through 10, and particularly those of Examples III, IV, V and VI.

While hand-held data terminals have greatly increased the accuracy and efficiency of product distribution, there are situations where it is desirable to allow the capture and recording of handwritten data rather than data that is entered by keystrokes. One such use would be to provide for the recording of signatures and for verification of the signatures recorded. In some applications, digitized pads are available to permit the entry of handwritten data, usually in situations where the data is entered by marking a predetermined location on a form that overlies the pad. However, to date there does not appear to be available any means for combining a handwritten data entry module with a portable data terminal in such a way that the handwritten data can be directly entered or read and entered by a scanner.

In an illustrated embodiment, the module contains a digitized pad which can capture and enter the handwritten data immediately as it is entered on the pad. The illustrated module is easily and quickly attached to a hand-held computer terminal by a hook-hinge arrangement, using the existing connector on the computer terminal and a connector on the module. In the embodiment of the module using a digitized pad, the module and hand-held terminal provide an integrated system while allowing normal hand-held portable operation with the module in place.

Figure 19:
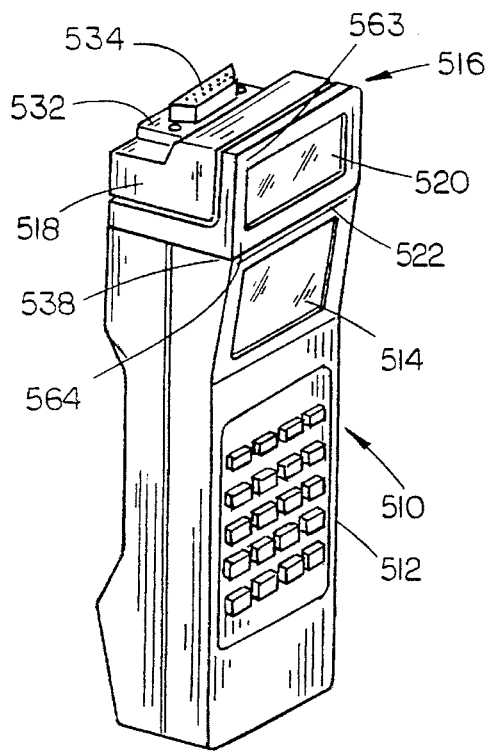
FIG. 19 is a perspective view of a hand-held data terminal with a signature pad module in place.
Figure 20:
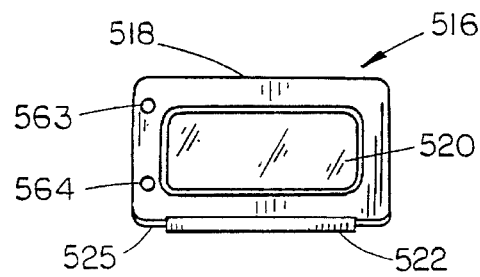
FIG. 20 is a front elevational view of the module.

Referring first to FIG. 19 of the drawings, there is illustrated a hand-held data terminal or computer terminal 510 of a type suitable for use with the signature pad module. A computer terminal such as the Model NT141GL hand-held computer terminal of Norand Corporation, Cedar Rapids, Iowa, has the necessary power and flexibility for this application. The computer terminal 510 has a keyboard 512 and a display 514. In addition to keyboard entry, data can be downloaded to the computer terminal 510 from a host computer or entered from a peripheral device such as a scanner.

The module providing for the entry of handwritten data is indicated generally by the reference numeral 516 and is shown in more detail in FIGS. 20 through 23. The module 516 comprises a suitable case 518 that houses a pad 520 for recording data in the manner described hereinafter. The case 518 has formed along the lower edge near the front a depending hinge 522 having a lug 524 extending along its entire length. Also, along the bottom surface 525 of the module 516 near the rear wall 526 is a cable plug 528 that will engage a standard receptacle (not shown) the top surface of the hand-held computer terminal 510. Plug 528 and the receptacle provide a standard 15-pin connection between these components. Near the top surface 532 of module 516 there is provided a suitable 15-pin receptacle 534 that provides for connection of other external devices. The receptacle 534 and plug 528 are suitably interconnected by means including ground cable 536 inside of the case 518.

The hinge 522 with its locking lug 524 provides for easy, quick and removable connection of the module 516 to the computer terminal 510. By engaging the locking lug 524 under a corresponding shoulder at 538 in the top surface of computer terminal 510 and rotating the module 516 rearwardly until the plug 528 on the module 516 engages the receptacle on the computer terminal 510, the module 516 is quickly and solidly affixed to the computer terminal 510 and all necessary connections made between plug 528 and its mating receptacle. The force applied by a user to the module 516 in entering handwritten data on the pad 520 will bias the module further into a locked position on the computer terminal 510. In order to remove the module 516 from the computer terminal 510, the module 516 is grasped and rotated forwardly in the direction opposite to the force that is applied during use. Thus, connection between the module 516 and computer terminal 510 is a solid, positive connection that is quickly and easily made.

The pad 520 can be of any suitable type for recording handwritten data. If a suitable optical scanner (not shown) is to be used as a part of the system, the pad 520 can very simply be any suitable means in which handwritten data can be visibly recorded so that it can be scanned and entered into the system by the scanner. Suitable optical scanners are available for reading handwritten data of all types and processing the information read digitally and entering the digitized data into the computer terminal 510. A suitable optical scanner for this purpose is described in the U.S. patent application Ser. No. 07/238,701, filed Aug. 31, 1988, by Steven E. Koenck, (Attorney Docket No. 6240), which application has been assigned to Norand Corporation, the same assignee of this application.

The pad 520 also may be a digitizer pad of a any suitable type containing resistive sheets forming a digitizer means 540 (FIG. 22) responsive to operating pressures in a suitable range normally applied by a user using a ballpoint pen. The digitized pad 520 using resistive sheets at 540 preferably has sufficiently high resolution to provide an accurate representation of handwritten data including signatures. The resistive sheets at 540 are preferably covered with an abrasion resistant cover 542 of a suitable polyester material. When the user enters data onto pad 520 by supplying sufficient pressure with a writing instrument to activate the resistive sheets at 540, the information is digitized, compressed and stored and/or transmitted to the computer terminal 510. For example, if the module 516 is being used for signature verification, a signature written on pad 520 can be immediately verified or stored for future verification.

From the foregoing description, it is evident that the data capture module provides the capability of capturing and recording handwritten data of all types, which data can be entered either directly using a digitizing pad on the module, or the handwritten data can be entered into the data terminal by a suitable optical scanner for further processing. All types of handwritten data, including both text and graphics, can be captured using the module in connection with a portable hand-held data terminal. One example that has been described is the verification of signatures, but any handwritten data can be entered directly or scanned into the terminal, the amount of data being limited by the available memory. The module thus provides a vehicle for significant data entry means not presently available with hand-held type computer terminals.

The actual volume occupied by the signature pad 520 and the printed circuit boards 562 and 570 is about 1¾ inch (wide) by 3¼ inch (long) by about 13/8 inch (deep). This is consistent with use with a pocket size receiving module such as shown in FIG. 10.

The pad active area may be 2.375 inches by 0.875 inch by 0.055 inch. The covering 542 may be 0.007 inch polyester. The pad may utilize a silicone elastomer pad sensor, and may provide a pad resolution of 175 points per inch giving a resolution of 415 points across and at least 150 points in height.

Generally the signature pad may comprise upper and lower resistive sheets of silicone elastomer which have resistive ink applied to the confronting faces so as to present uniform resistivity over the surfaces. Application of point pressure to the cover sheet 542 causes the resistive layers to contact at a corresponding point.

For tractor fed forms, alignment pegs 563, 564 on the bezel part 518B are used to engage in the form feed holes to hold the form in position during the signature capture process. Should the sensor pad 520 be damaged, the bezel part 518B including the sensor pad can be replaced without replacing the entire unit. This is accomplished by removing screws 553, 554 and pivoting parts 518A, 518B away from each other. The connector 560 can then be unplugged from the input/output printed circuit board 562. The ground cable 536 may be separable at 568.

Figure 22:
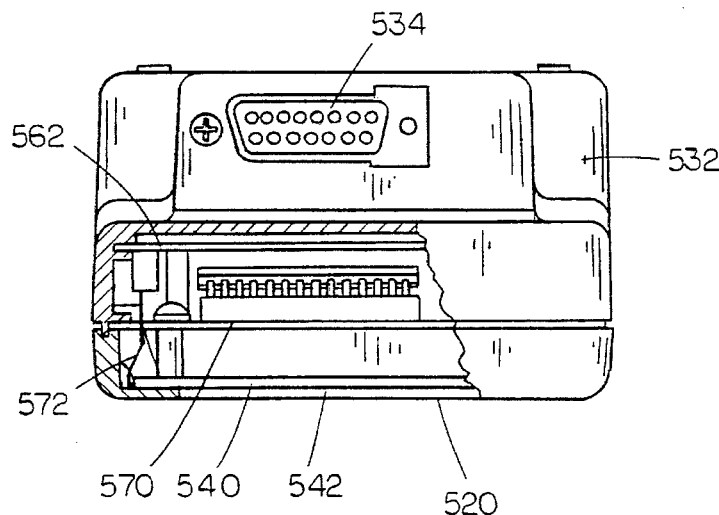
FIG. 22 is a top view of the module, partly in section.
Figure 23:
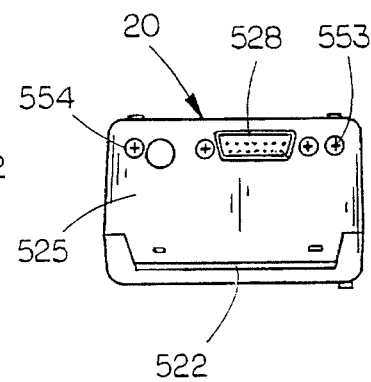
FIG. 23 is a bottom view of the module.

Printed circuit board 570 may carry components such as a CPU chip (e.g. type 80C31), CMOS static RAM (e.g. 32K×8), and an EPROM component (e.g. type 27C256) as indicated at 571, FIG. 22.

The printed circuit boards 562 and 570 are 13/8 inch by 3 inch by less than 1/16 inch and are separated from each other by about one-half inch. Coupling between the digitizer pad 540 and the circuitry of board 562 may be by means of two twin conductor ribbons such as that indicated at 572, FIG. 22.

Figure 21:
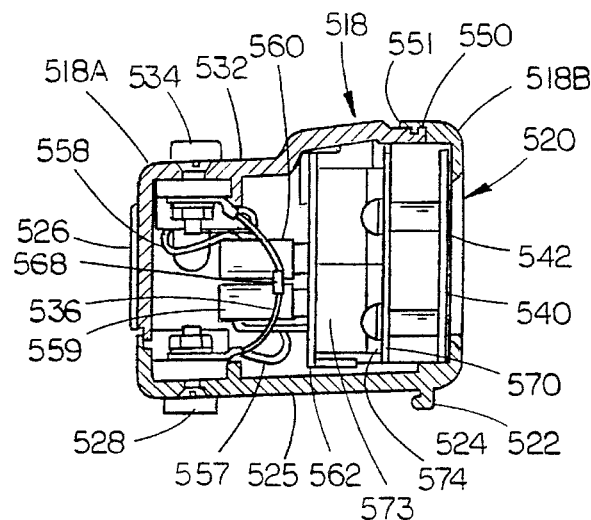
FIG. 21 is a sectional view of the module.

Referring to FIG. 21, it can be seen that case 518 is formed of a base assembly 518A and a bezel assembly 518B. The base assembly includes an outwardly facing hook plate 550 which interlocks with a receiving recess of the bezel assembly. The parts 518A, 518B are pivotal at the hook plate-recess into a snug interfitting relationship, with edge 551 fitting into a receiving channel of part 518B. The parts are then secured together by means of screws 553,554, FIG. 23. The channel may have a sealing strip seated therein, e.g. a 0.052 inch diameter elastomer 12.5 inches long.

Ribbon connectors 557, 558 from the 15-pin plug 528 and 15-pin receptacle 534 are provided with internal 16 position receptacles 559, 560 which connect with headers on the input/output printed circuit board 562. When the pad is disabled, communications will pass between connectors 528 and 534 unmodified.

By way of an alternate example, the resistive sheets may be of Mylar of five mils (0.005 inch) thickness. In any case, conductive x-axis conductive strips may extend along the long edges of the upper resistive layer, and Y-axis conductive strips may extend along the short edges of the lower resistive layer, the pairs of conductive strips being connected with conductors of respective ribbons such as 572, FIG. 22.

Conveniently the outer sheet is somewhat longer in the length and width dimensions so as to overlie a metal frame 573, FIG. 22, while the inner sheet is seated in a recess within the confines of the frame 573. The outer resistive sheet is then fastened at its margins to the frame so that there is normally a clearance air space of approximately ten to thirty mils (one mil equals 0.001 inch) between the two resistive layers. The confronting resistive surfaces may comprise graphite ink resistive surfaces as is well understood in the art.

DESCRIPTION OF FIGS. 24 AND 25

Figure 24:
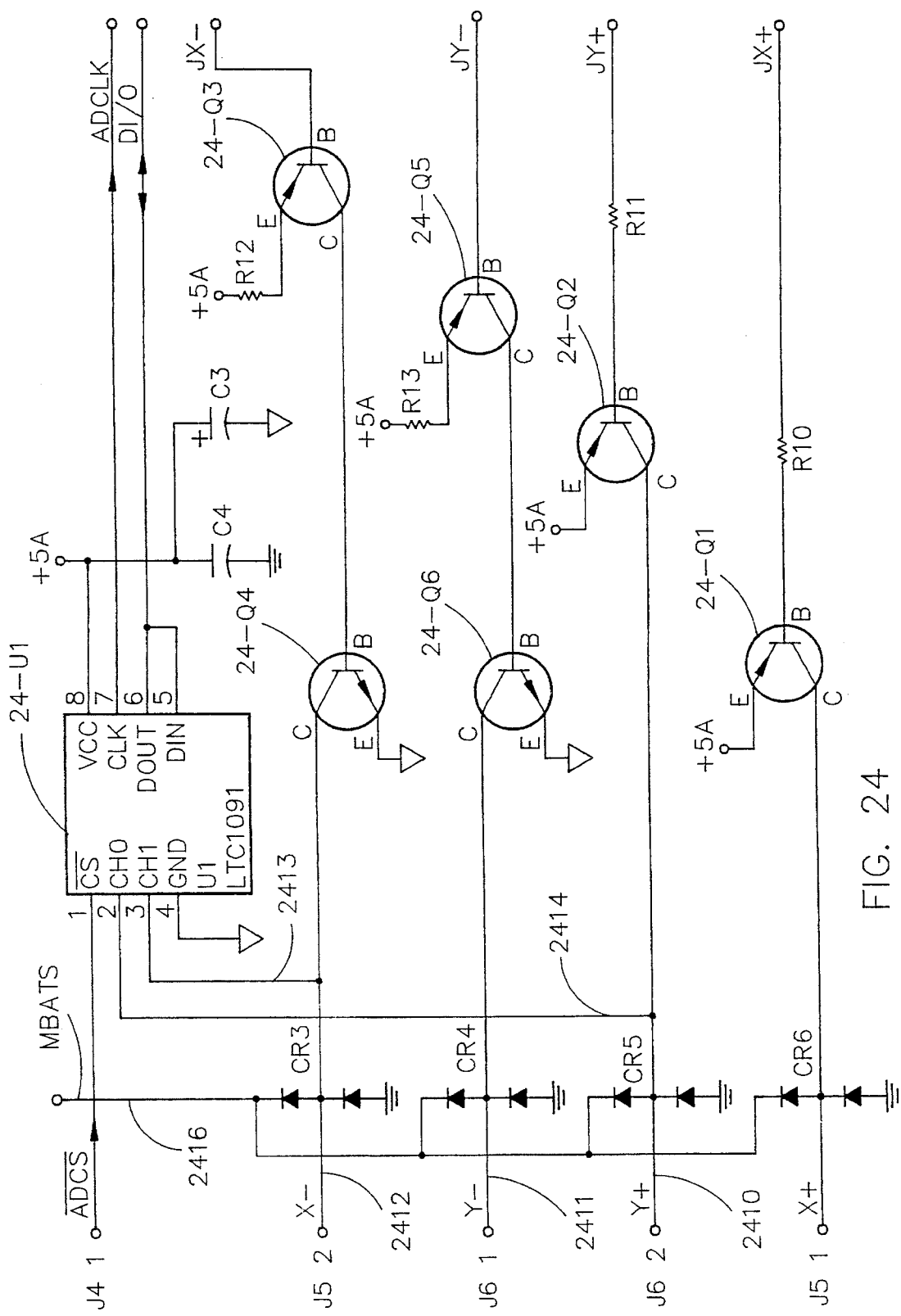
FIGS. 24 and 25 show exemplary circuitry for the input/output printed circuit board of the embodiment of FIGS. 19–23.
Figure 25:
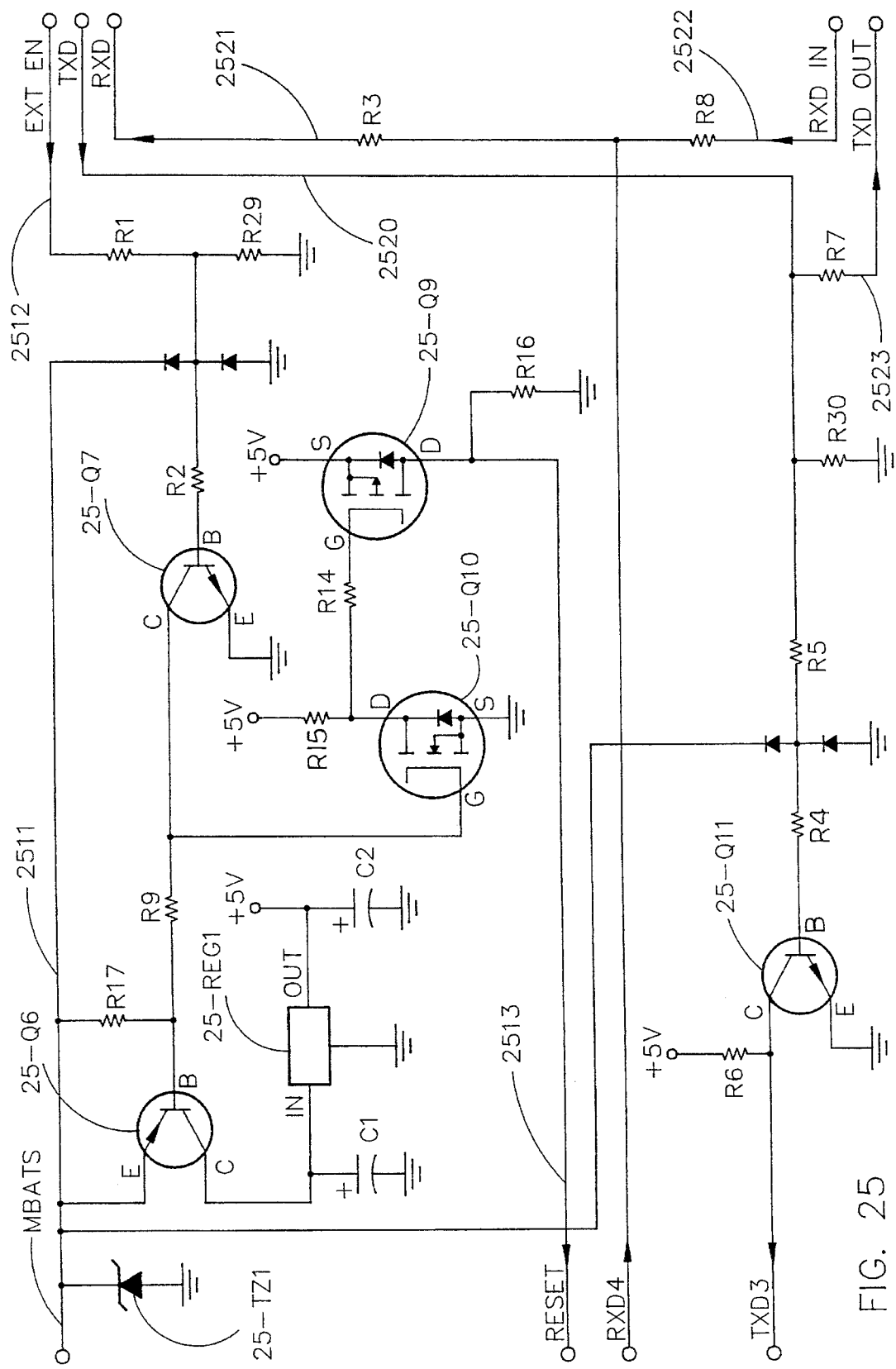
Figure 26:
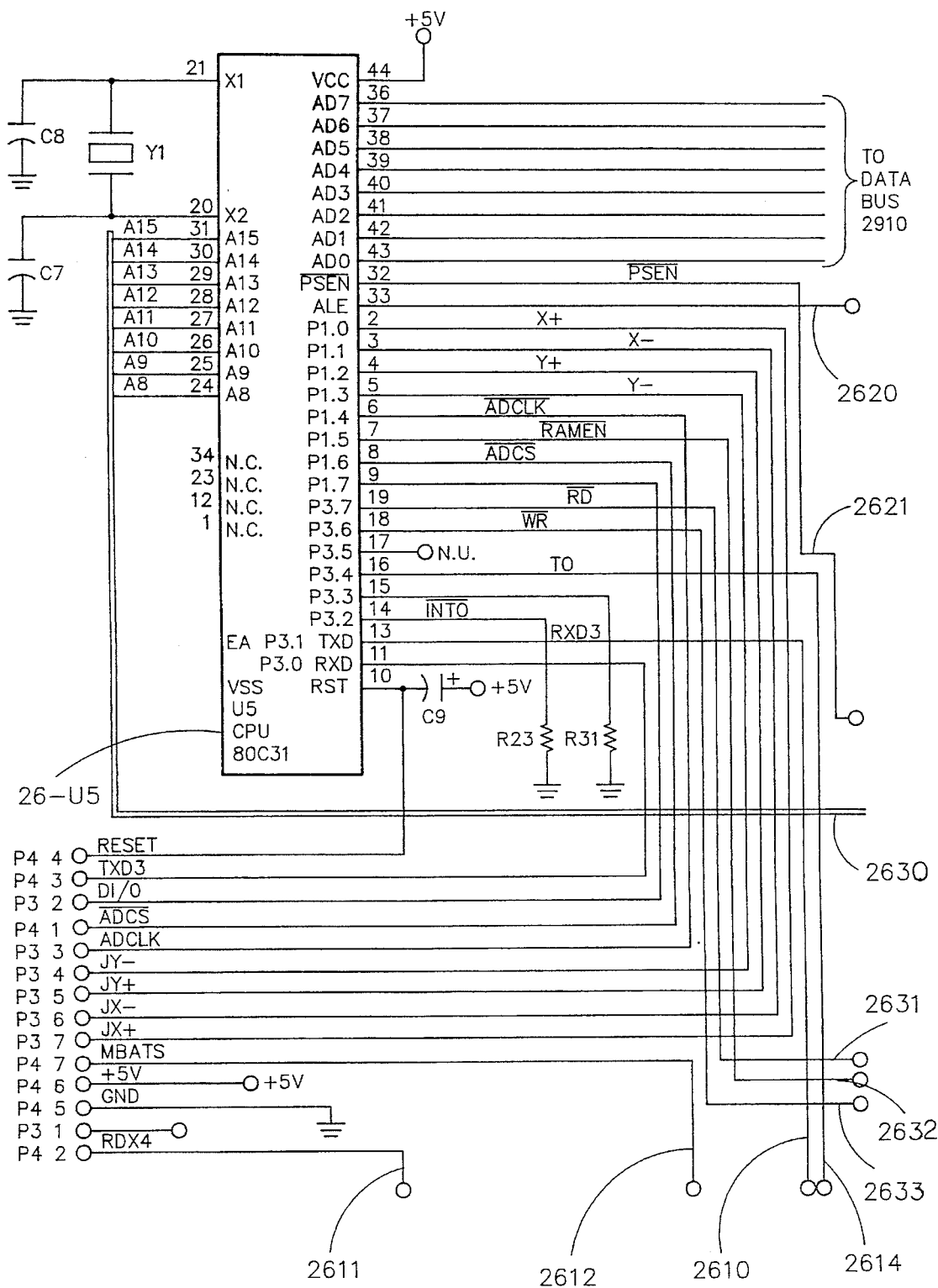
FIGS. 26–29 show exemplary circuitry for the CPU printed circuit board of the embodiment of FIGS. 19–23.

FIGS. 24 and 25 illustrate exemplary circuitry for the input/output printed circuit board 562. FIG. 24 shows the circuitry connected to the X and Y axis conductive strips of the signature pad 520. For reading an X-axis dimension from the signature pad, transistors 24-Q2, 24-Q5 and 24-Q6 are turned on to apply a potential of five volts analog, (+5A), through transistor 24-Q2 to the Y+ conductor 2410 which leads to the Y axis strip at one end of the inner resistive surface. The return path from the other end of the inner resistive strip is via Y-conductor 2411 and transistor 24-Q6, creating a potential distribution along the long X-axis dimension of the pad. The X-axis potential value at the point contacting the outer resistive sheet is coupled via conductors 2412 and 2413 to the channel one input of analog to digital converter 24-U1 (e.g. type LTC1091).

Similarly, to read out a Y-axis value, transistors 24-Q3, 24-Q4 and 24-Q1 are turned on, and the Y-axis potential at the contact point is read out via the inner resistive sheet and conductors 2410 and 2414 leading to the channel zero input of the analog to digital converter 24-U1.

In FIG. 25, line 2511 receives battery voltage MBATS from the terminal 10. Line 2511 is coupled with pin 15 of connector 528, via position 15 of receptacle 559, FIG. 21. The I/O printed circuit board 562 connects position 15 of the header receiving receptacle 559 with position 15 of the header for receptacle 560. Line 2511 connects with line 2416, FIG. 24, and connects to the CPU printed circuit board 570 via mating interboard connectors such as 573, 574, FIG. 3, a capacitor (not shown, 0.01 microfarad, 50 volts), being connected between MBATS and ground in parallel with 25-TZ1.

Applying EXT EN to conductor 2512 serves to transmit a reset signal to the processor of board 570 via 25-Q7, 25-Q10, 25-Q9 and 2513 (RESET).

The signals associated with the various positions of connectors 528 and 534 are as follows:

| Connector 528 | | | Connector 534 | | |
|---|---|---|---|---|---|
| J1 | 1 | TXD | J2 | 1 | TXD Out |
| J1 | 2 | DTR | J2 | 2 | DTR |
| J1 | 3 | RTS | J2 | 3 | RTS |
| J1 | 4 | RCT | J2 | 4 | RCT |
| J1 | 5 | RXD | J2 | 5 | RXD IN |
| J1 | 6 | CTS | J2 | 6 | CTS |
| J1 | 7 | DSR | J2 | 7 | DSR |
| J1 | 8 | CHG In | J2 | 8 | CHG In |
| J1 | 9 | GND | J2 | 9 | GND |
| J1 | 10 | XOVER/TXL | J2 | 10 | XOVER/TXL |
| J1 | 11 | ———PROX/RXC | J2 | 11 | ———PROX/RXC |
| J1 | 12 | SCAN/PWR | J2 | 12 | SCAN/PWR |
| J1 | 13 | EXT EN | J2 | 13 | N.U. |
| J1 | 14 | RCR/CD | J2 | 14 | RCR/CD |
| J1 | 15 | MBATS | J2 | 15 | MBATS |
| J1 | 16 | N.U. | J2 | 16 | N.U. |

The symbols J1 and J2 actually refer to the headers on I/O board 562 receiving connectors 559 and 560, respectively. Thus position 16 is not used. Position 13 of J1 connects with line 2512, position 1 connects with line 2520 and position 5 connects with line 2521. Line 2522 connects with position 5 of J2, and line 2523 connects with position 1 of J2. The printed circuit board provides direct connections between positions of J1 and J2 designated DTR, RTS, RCT, CTS, DSR, RCR/CD, RCT, CHG IN, XOVER/TXL, and PROX/RSC, MBATS and GND.

The transistor 25-Q6 controls supply of power to the pad regulator 25-REG1.

The interboard connectors on board 562 such as 573, FIG. 21, are designated J3 and J4 carry the following signals.

| J3 | 1 | N.U. | J4 | 1 | ———ADCS |
|---|---|---|---|---|---|
| J3 | 2 | DI/O | J4 | 2 | RDX4 |
| J3 | 3 | ADCLK | J4 | 3 | TXD3 |
| J3 | 4 | JY– | J4 | 4 | RESET |
| J3 | 5 | JY+ | J4 | 5 | GND |
| J3 | 6 | JX– | J4 | 6 | +5V |
| J3 | 7 | JX+ | J4 | 7 | MBATS |

DESCRIPTION OF FIGS. 26, 27, 28 AND 29

FIGS. 26–29 show exemplary circuitry for the CPU board 570. The interboard connectors on board 570 such as connector 574 are designated P3 and P4 and connect with the CPU, 26-U5, of board 570 as indicated in the following table:

| CPU (Type 80C31) | | | | |
|---|---|---|---|---|
| | | | Pin | CPU Pin Designation |
| P3 | 1 | N.U. | | |
| P3 | 2 | DI/9 | 9 | P 1.7 |
| P3 | 3 | ADCLK | 6 | P 1.4 |
| P3 | 4 | JY– | 5 | P 1.3 |
| P3 | 5 | JY+ | 4 | P 1.2 |
| P3 | 6 | JX– | 3 | P 1.1 |
| P3 | 7 | JX+ | 2 | P 1.0 |
| P4 | 1 | ———ADCS | 8 | P 1.6 |
| P4 | 3 | TXD3 | 11 | RXD |
| P4 | 4 | RESET | 10 | RST |
| P4 | 5 | GND | 22, 35 | VSS, EA |
| PR | 6 | +5V | 44 | VCC |

Figure 27:
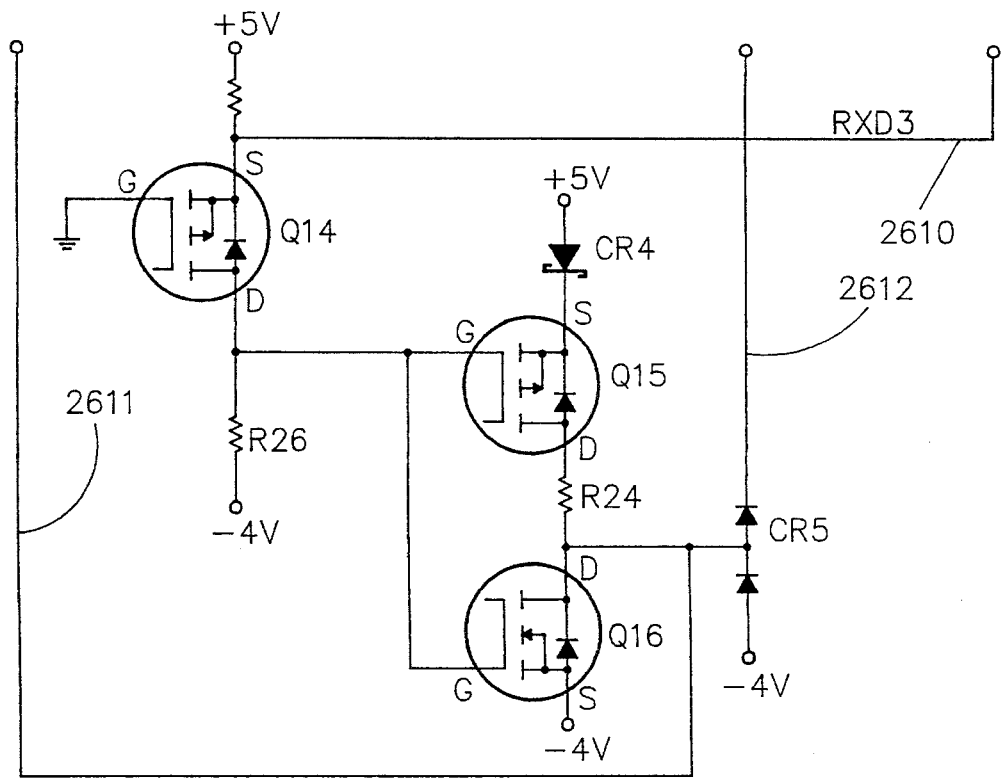
Figure 28:
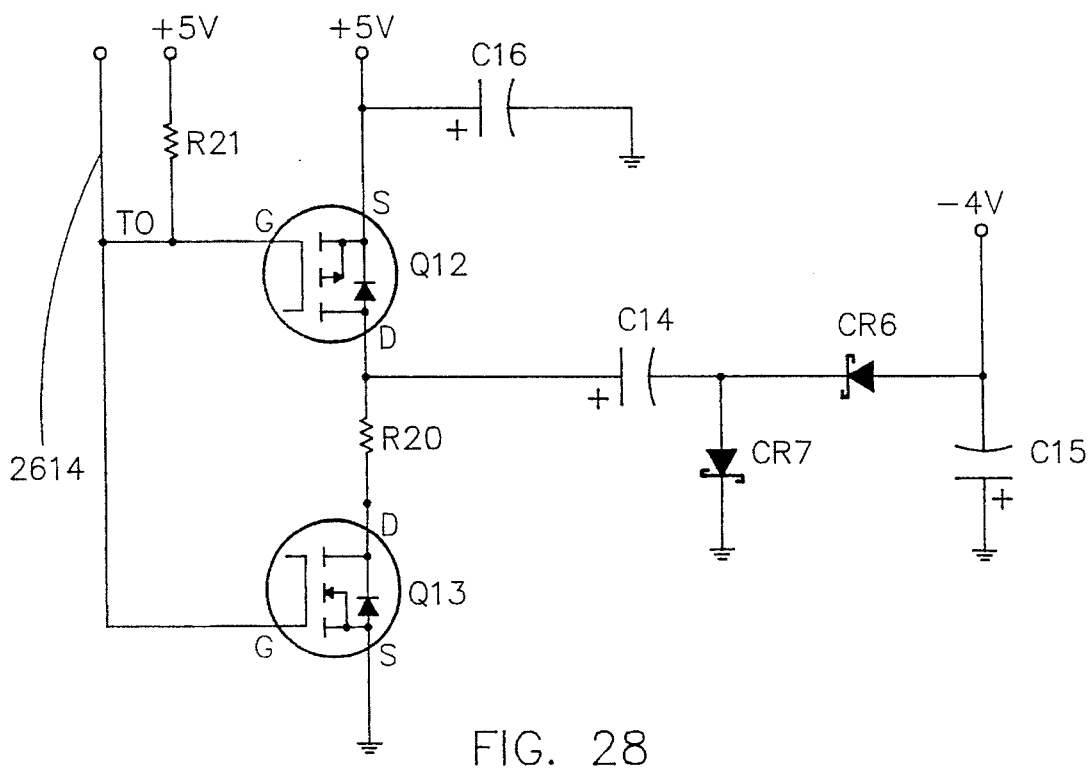
Figure 29:
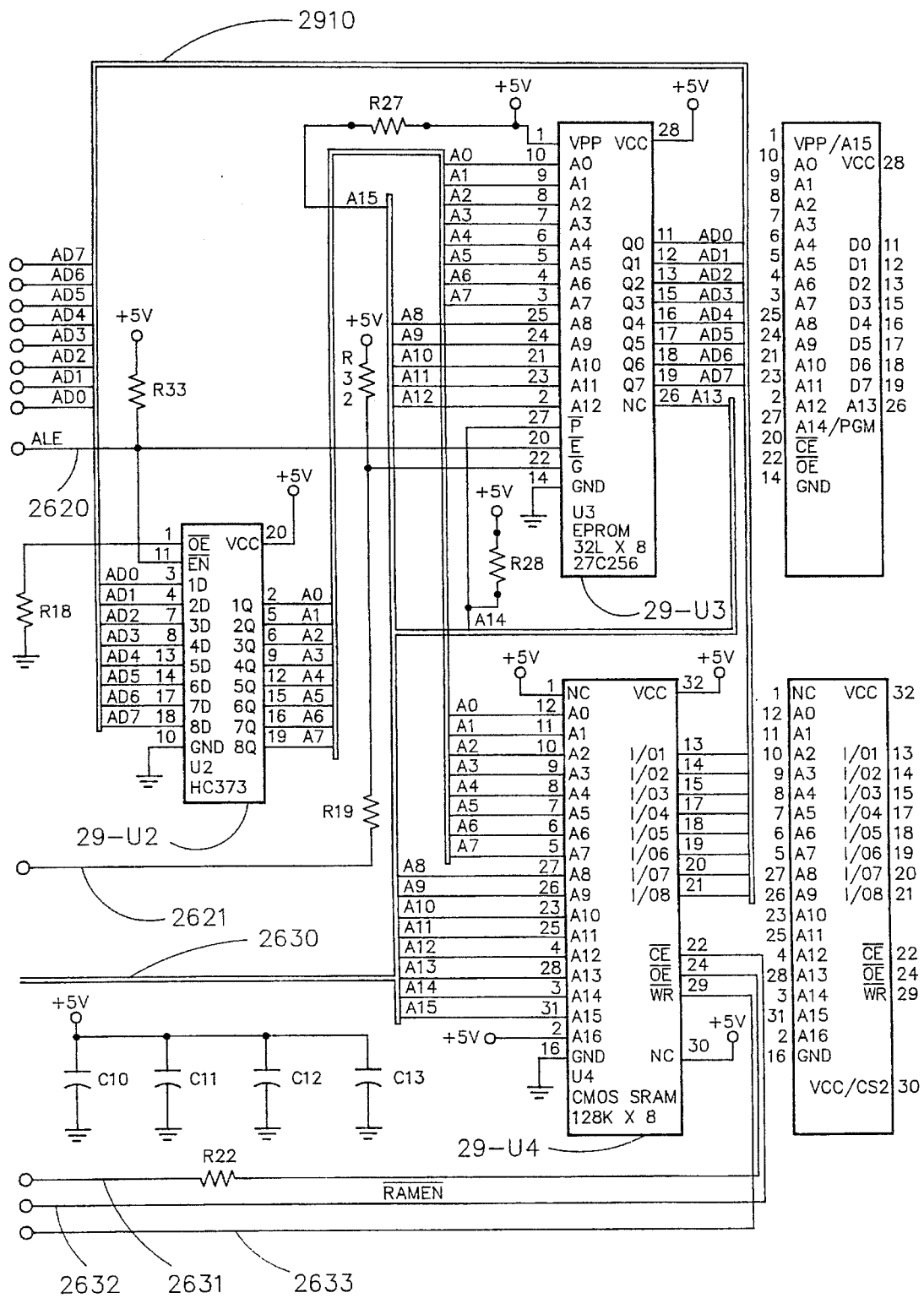

Pin 13 (TXD) of CPU 26-U5 connects via line 2610 (RXD3) with the circuit of FIG. 27, which in turn drives line 2611 (RXD4). MBATS line 2612 also connects with FIG. 27. Line 2614 connects with the circuit of FIG. 28. Pins of CPU 26-U5 designated AD7-AD0, respectively connect with data bus 2910, FIG. 29. The pin of 26-U5 designated ALE connects with latch 29-U2 and EPROM 29-U3 via line 2620. Pin 32 of ($\overline{PSEN}$) connects via line 2621 with 29-U3. Address bus 2630 from pins designated A8-A15 of 26-U5 connects with components 29-U3 and 29-U4 (a CMOS static random access memory, e.g., 128K×8).

Pin $\overline{RD}$ of CPU 26-U5 connects via line 2631, pin $\overline{RAMEN}$ connects via line 2632; and pin $\overline{WR}$ connects via line 2633, with 29-U4.

Although the invention has been described in connection with certain preferred embodiments thereof, it will be evident to those skilled in the art that various revisions and modifications may be made. Also the illustrated embodiments can be adapted to applications differing from those described by way of example herein without departing from the spirit and scope of the invention. It is our intention that all such revisions and modifications be included within the scope of the present disclosure.

EXAMPLE VII

As an example pursuant to FIG. 10 and FIGS. 19–29, a signature pad may have the configuration illustrated in FIG. 7 for interfitting in receptacle 261, FIG. 10, as described in Example I for module 200. The printed circuit boards 562 and 570 could be consolidated into a single printed circuit board underlying the signature pad and having comparable dimensions, e.g. about two inches by three inches. The inputs and outputs from the consolidated circuit board could comprise MBATS, GND, EXT EN, and the communication lines for two-way alternate point-to-point communication. These inputs and outputs could couple with module 200 at a region such as 280 using mating surface contacts as previously described with reference to FIG. 10.

Battery power could be available in the receiving module 260 at 282, and protocol conversion and other functions of the terminal could be performed by a modular processor at 300. A touch screen corresponding to 202 could be included at the three margins of the signature pad at the top surfaces of module 260, FIG. 10.

By way of example, signatures as digitized by means of the signature pad module could be transferred under the control of the processor module at 300 to a data storage card inserted in slot 262. Alignment pegs such as 563, 564, FIG. 20, could form part of the signature pad module, such that a touch screen overlying battery compartment 282 would be accessible to activate the signature pad module by transmitting EXT EN to the pad module in response to actuation of a region of the touch screen in signature capture mode.

Such touch screen would then signal when a signature had been properly digitized and stored. The touch screen associated with module 260 can accommodate the entire data capture command set.

Figure 30:
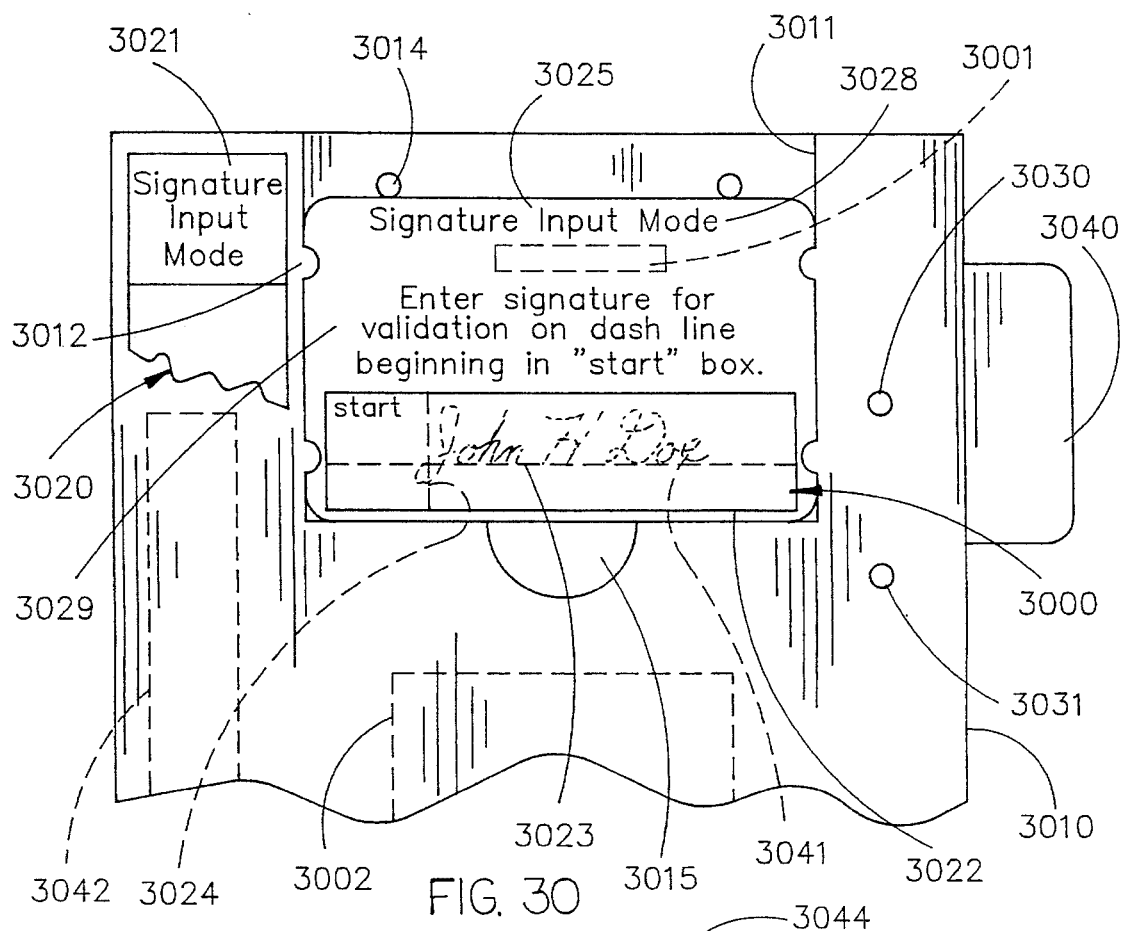
FIG. 30 is a partial plan view showing a computerized processor module assembled in a receiving module and operating in signature input mode.
Figure 31:
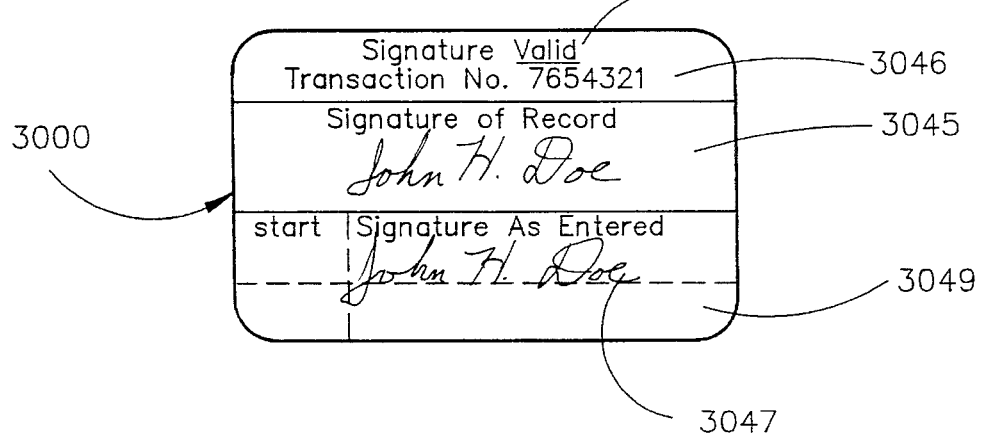
FIG. 31 shows the computerized processor module displaying the results of a signature verification operation for the case where the processor module functions as a separate self-contained unit using its own battery power.

EXAMPLE VIII (FIGS. 30 and 31)

In Example VIII, the circuitry of FIGS. 24–29 may be part of a computerized processing module 3000, FIG. 30, generally as described with respect to FIGS. 7, 8 and 9. A receiving module 3010 (corresponding to module 260 of FIG. 10) may receive the module 3000 and may have coupling means such as 280, FIG. 10, for engagement with cooperating connection means 3001 of module 3000.

In this Example VIII, the receiving module 3010 may perform the functions of data entry terminal 510, FIG. 19, and in common with FIG. 10, may provide battery means 3002 (as at 282, FIG. 10) capable of providing for battery operation of the circuitry of FIGS. 24–29. In particular, receiving module 3010 would have coupling means (corresponding to 280, FIG. 10) for automatically engaging with the connection means 3001 as module 3000 is inserted into a receptacle 3011 of module 3010. The coupling means and connection means 3001 could also provide automatically completed signal communication paths such as provided by the terminal connector automatically mating with connector 528, FIG. 23, during assembly of parts 510 and 516, FIG. 19. The module 3010 may have ledges such as 3012 for overlying the side edges of the module 3000, and may include segmental spherical detents such as 3014 which are spring urged into receptacle 3011 to retain the module 3000 therein. A notch 3015 may facilitate removal of the complete module 3000 as a unit from the receptacle 3011.

The module 3010 may have a touch screen 3020 such as described with reference to FIGS. 7, 8, 9. One of the touch switch positions may be "Signature Input Mode" as indicated at 3021. When this mode is selected by manually depressing region 3021, a graphic display is produced on module 3000 as indicated in FIG. 30 which facilitates the handwritten entry of a signature e.g. in a space indicated by a box displayed at 3022 with a signature line at 3023, and a "start" box indicated by a dash line 3024.

As described with reference to FIGS. 7, 8 and 9, module 3000 may include a digitizer input screen 3025 over substantially its entire length and width as viewed in FIG. 30, and a graphic display e.g. of the dot matrix type may underlie the digitizer screen and have a resolution sufficient to accurately display handwritten data such as signatures and the like, as well as indicia such as 3022, 3023, and 3024. (See the displays at 230 and 450, FIG. 9 as further examples).

Where the signature is to be entered directly on the digitizer screen 3025, a wooden stylus is conveniently used. In this event, the display means of module 3000 may display the mode at 3028 and suitable instructions at 3029.

Where a form with feed holes is to be engaged with pegs 3030, 3031 on module 3010, the form may have printed thereon indicia such as 3022, 3023, 3024, "start", and 3029. In this case, a conventional ball point pen may be used to enter the signature on the form, and to apply a corresponding impression to the digitizer input screen 3025 of FIG. 30.

By way of example, the computerized processing module 3000, or a data storage card such as indicated at 3040 (inserted into a slot such as 262, FIG. 10) may store the authorized signatures of persons empowered to approve a given transaction. Thus, a person delivering goods to various establishments may download authorized signatures for a given delivery into the module 3000 just prior to making the delivery, or may select a respective data storage card 3040 from a file thereof.

After the signature impression such as 3041 has been entered in space 3022 of the digitizer input screen, the processor of module 3000 or a processor 3042 of module 3010 (e.g. as at 300, FIG. 10) may carry out a comparison of the signature impression 3041 with the stored authorized signatures. If there is a sufficient match with an authorized signature the graphical display may indicate that the signature was a valid authorized signature as at 3044, FIG. 31.

The matching authorized signature of record may be displayed in space 3045, FIG. 31, or the name represented by the signature may be simply printed in space 3045. A transaction number may be assigned as indicated at 3046. Further, the signature 3047 corresponding to impression 3041, as stored by module 3000, module 3010 or storage card 3040 may be displayed at a region 3049 adjacent region 3045 so that the operator can confirm the matching condition, or actually make the decision as to whether the signature is to be accepted. Of course, the signature as entered may be stored in fully digitized form or in a suitably compacted form in module 3000, module 3010 or storage card 3040.

DESCRIPTION OF EXAMPLE IX

Example VIII could be applied to the embodiment of FIGS. 19–29 as a further example, in which case the resistive type digitizer screen 520 could be used for the direct entry of a signature e.g. using a passive wooden stylus, and display 514 could provide a resultant display such as indicated in FIG. 31, and could display indicia such as 3028 and 3029, prior to entry of the signature impression 3041. The signature comparison program, and the set of authorized signatures could then be downloaded into the data terminal 510, e.g. via connectors 534 and 528 from a data storage system within a delivery vehicle or the like. Reference may be made to U.S. Pat. No. 4,798,919 which teaches using the sensing of pressure applied across the signature as a further parameter for use in signature verification.

SUMMARY RE EXAMPLES VIII AND IX

In examples VIII and IX, computerized processing module 3000 provides for the computerized processing and storage of data as described in detail in reference to FIGS. 19–29. The stored data e.g. complete digitized information concerning a signature impression 304 1 may be transmitted from random access storage such as indicated at 29-U4 via connection means 3001 to an external receiving module such as 3010 or 510, FIG. 19. The computerized processing module 3000 could be of size to fit in a shirt pocket as with module 516, FIG. 19, e.g. a cross sectional perimeter of not more than about eight inches and a length dimension of not more than about five inches.

The connection means 3001 of module 3000 automatically engages with the coupling means in receptacle 3011 (analogous to coupling means 280, FIG. 10), as the module 3000 is inserted over detents 3014 and under ledges 3012 to assemble the module 3000 with the receiving module 3010. Correspondingly, the connection means 3001 is automatically disengaged from the coupling means as the module 3000 is removed as a unit from receptacle 3011 (e.g. with the use of one finger inserted into notch 3015).

The digitizer input screen 3025 is transparent so that the matrix type display there beneath is visible to the user through the digitizer screen. Any of the digitizer technologies currently available such as those referred to herein may be utilized. Both the digitizer input and the graphical display of module 3000 have a resolution to accurately record and display handwritten characters such as represented by signatures 3041, 3045 and 3047. The data such as signatures stored in module 3000 in complete digitized form or in compacted form may be transmitted to the coupling means of receiving module 3010 for utilization externally of module 3000. For example, receiving module 3010 may have a programmed processor at 3042 for comparing a signature impression data relating to a signature impression 3041 with a set of authorized signatures stored on a data storage card 3040.

The display of module 3000 may display indicia such as 3022, 3023, and 3024 for facilitating input of a signature impression such as 3041 directly on the digitizer input screen 3025, or a form may be located e.g. by pegs 3030, 3031 and itself have indicia printed thereon. In Example IX, a conventional display screen at 514, FIG. 19, of a receiving module 510, may display instructions adjacent a digitizer screen at 520, and may provide a display such as indicated in FIG. 31, once a signature impression at 520 has been compared with a set of authorized signatures stored by the receiving module 510, FIG. 19.

It will be apparent that many further modifications and variations may be effected without departing from the teachings and concepts of the present disclosure.

We claim as our invention:

1. A hand-held data processing system, comprising:
   a self-contained computerized processing module for computerized processing of data;
   said processing module having a graphical display with a display screen occupying substantially an entire broad side of the processing module;
   means for displaying information over substantially the entire surface of the display screen;
   said self-contained computerized processing module having a size so as to be readily contained in a shirt pocket; and
   said processing module further including optical reader means for effecting the input of optical information.

2. The hand-held data processing system according to claim 1, wherein said graphical display means is operably coupled with said optical reader means, whereby information read by said optical reader means is displayed.

3. The hand-held data processing system according to claim 1, further including means for registering the path of movement of a stylus over the surface of the display screen to receive a manually generated path information.

4. The hand-held data capture system, comprising:
   multipurpose computerized processing module means for computerized processing of data;
   shell module means having auxiliary means for executing an auxiliary function, having battery means supplying power thereto, and having a receptacle for receiving said computerized processing module means so that the computerized processing module means is substantially contained within said shell module means during hand-held operation;
   coupling means for providing communication between said shell module means and a computerized processing module means in said receptacle;
   said shell module means with said computerized processing module means assembled in its receptacle having an overall size so as to be readily contained in a shirt pocket;
   said computerized processing module means includes battery means for supplying power thereto and said computerized processing module fitting into the receptacle together with said battery means for removal as a unit therewith;
   said coupling means providing a quick-connect, quick-disconnect coupling readily accommodating bodily removal of the computerized processing module means and the battery means as a unit from the receptacle of the shell module means; and
   said shell module means including means accommodating insertion of a smart card therein for coupling with the computerized processing module means.

5. The hand-held data capture system according to claim 4, wherein said computerized processing module means includes means operable for carrying out an optical reading function while entirely separate from said shell module means, and also for carrying out an optical reading function while substantially contained within said shell module means.

6. The hand-held data capture system according to claim 4, wherein said computerized processing module means includes touch screen display means operable for presenting a graphical display and for receiving and storing manual input data while entirely separate from said shell module means.

7. The hand-held data capture system according to claim 4, wherein said computerized processing module means includes input screen means for registering the path of movement of a stylus thereon so as to receive manually entered path information while entirely separate from said shell module means.

8. The hand-held data capture system according to claim 4, wherein said computerized processing module means together with said peripheral shell module means selectively provides a touch screen display and a stylus path responsive digitizing input at a common display region.

9. The hand-held data capture system according to claim 4, further including automatic reading data capture means for the automatic reading of data into the system.

10. The hand-held data capture system according to claim 9 wherein said automatic reading data capture means comprise an automatic optical reader including a light source means for illuminating a complete line of data.

11. The hand-held data capture system according to claim 9, wherein said automatic reading data capture means comprises automatic path input means for automatically registering hand-entered path configurations.

12. The hand-held data capture system according to claim 11, wherein said automatic path input means comprises digitizing means responsive to stylus generated handwriting configurations.

13. A hand-held data capture system, comprising:
   multipurpose computerized processing module means for computerized processing of data;
   shell module means having auxiliary means for executing an auxiliary function, having battery means supplying power thereto, and having a receptacle for receiving said computerized processing module means so that the computerized processing module means is substantially contained within said shell module means during hand-held operation;
   coupling means for providing communication between said shell module means and a computerized processing module means in said receptacle;
   said shell module means with said computerized processing module means assembled in its receptacle having an overall size so as to be readily contained in a shirt pocket;
   said computerized processing module means includes battery means for supplying power thereto and said computerized processing module fitting into the receptacle together with said battery means for removal as a unit therewith;

said coupling means providing a quick-connect, quick-disconnect coupling readily accommodating bodily removal of the computerized processing module means and the battery means as a unit from the receptacle of the shell module means;

automatic reading data capture means for the automatic reading of data into the system; and said computerized processing module means including means operable for carrying out an optical reading function while entirely separate from said shell module means, and also for carrying out an optical reading function while substantially contained within said shell module means.

14. A hand-held data capture system, comprising:

multipurpose computerized processing module means for computerized processing of data;

shell module means having auxiliary means for executing an auxiliary function, having battery means supplying power thereto, and having a receptacle for receiving said computerized processing module means so that the computerized processing module means is substantially contained within said shell module means during hand-held operation;

coupling means for providing communication between said shell module means and a computerized processing module means in said receptacle;

said shell module means with said computerized processing module means assembled in its receptacle having an overall size so as to be readily contained in a shirt pocket;

said computerized processing module means includes battery means for supplying power thereto and said computerized processing module fitting into the receptacle together with said battery means for removal as a unit therewith;

said coupling means providing a quick-connect, quick-disconnect coupling readily accommodating bodily removal of the computerized processing module means and the battery means as a unit from the receptacle of the shell module means;

automatic reading data capture means for the automatic reading of data into the system; and said computerized processing module means including touch screen display means operable for presenting a graphical display and for receiving and storing manual input data while entirely separate from said shell module means.

15. A hand-held data capture system, comprising:

multipurpose computerized processing module means for computerized processing of data;

shell module means having auxiliary means for executing an auxiliary function, having battery means supplying power thereto, and having a receptacle for receiving said computerized processing module means so that the computerized processing module means is substantially contained within said shell module means during hand-held operation;

coupling means for providing communication between said shell module means and a computerized processing module means in said receptacle;

said shell module means with said computerized processing module means assembled in its receptacle having an overall size so as to be readily contained in a shirt pocket;

said computerized processing module means includes battery means for supplying power thereto and said computerized processing module fitting into the receptacle together with said battery means for removal as a unit therewith;

said coupling means providing a quick-connect, quick-disconnect coupling readily accommodating bodily removal of the computerized processing module means and the battery means as a unit from the receptacle of the shell module means;

automatic reading data capture means for the automatic reading of data into the system; and said computerized processing module means including input screen means for registering the path of movement of a stylus thereon so as to receive manually entered path information while entirely separate from said shell module means.

16. In a hand-held data capture system, (a) computerized processing module means for computerized processing of data;

(b) shell module means having auxiliary means for executing an auxiliary function, having battery means supplying power thereto, and having a receptacle for receiving said computerized processing means so that the computerized processing module means is substantially contained within said shell module means during hand-held operation;

(c) coupling means providing communication between said shell module means and a computerized processing module means in said receptacle;

(d) said shell module means with said computerized processing module means assembled in its receptacle having an overall size so as to be readily contained in a shirt pocket;

(e) said computerized processing module means having battery means supplying power thereto and said computerized processing module means fitting into the receptacle together with said battery means for removal as a unit therewith;

(f) said coupling means providing a quick-connect, quick-disconnect coupling readily accommodating bodily removal of the computerized processing module means and the battery means as a unit from the receptacle of the shell module means;

(g) said system comprising automatic reading data capture means for the automatic reading of data into the system; and (h) said computerized processing module means having means operable for carrying out an optical reading function while entirely separate from said shell module means, and also for carrying out an optical reading function while substantially contained within said shell module means.

17. The hand-held data capture system according to claim 16 wherein said automatic reading data capture means comprises an automatic optical reader including a light source means for illuminating a complete line of data.

18. In a hand-held data capture system according to claim 16, said automatic reading data capture means comprising automatic path input means for automatically registering hand-entered path configurations.

19. In a hand-held data capture system according to claim 16, said automatic path input means comprising digitizing means responsive to stylus generated handwriting configurations.

20. In a hand-held data capture system, (a) multipurpose computerized processing module means for computerized processing of data;

(b) shell module means having auxiliary means for executing an auxiliary function, having battery means supplying power thereto, and having a receptacle for receiving said computerized processing means so that the computerized processing module means is substantially contained within said shell module means during hand-held operation;

(c) coupling means providing communication between said shell module means and a computerized processing module means in said receptacle;

(d) said shell module means with said computerized processing module means assembled in its receptacle having an overall size so as to be readily contained in a shirt pocket;

(e) said computerized processing module means having battery means supplying power thereto and said computerized processing module means fitting into the receptacle together with said battery means for removal as a unit therewith;

(f) said coupling means providing a quick-connect, quick-disconnect coupling readily accommodating bodily removal of the computerized processing module means and the battery means as a unit from the receptacle of the shell module means;

(g) said system comprising automatic reading data capture means for the automatic reading of data into the system; and (h) said computerized processing module means having touch screen display means operable for presenting a graphical display and for receiving and storing manual input data while entirely separate from said shell module means.

21. In a hand-held data capture system, (a) computerized processing module means for computerized processing of data;

(b) shell module means having auxiliary means for executing an auxiliary function, having battery means supplying power thereto, and having a receptacle for receiving said computerized processing means so that the computerized processing module means is substantially contained within said shell module means during hand-held operation;

(c) coupling means providing communication between said shell module means and a computerized processing module means in said receptacle;

(d) said shell module means with said computerized processing module means assembled in its receptacle having an overall size so as to be readily contained in a shirt pocket;

(e) said computerized processing module means having battery means supplying power thereto and said computerized processing module means fitting into the receptacle together with said battery means for removal as a unit therewith;

(f) said coupling means providing a quick-connect, quick-disconnect coupling readily accommodating bodily removal of the computerized processing module means and the battery means as a unit from the receptacle of the shell module means;

(g) said system comprising automatic reading data capture means for the automatic reading of data into the system; and (h) said computerized processing module means having input screen means for registering the path of movement of a stylus thereon so as to receiving manually entered path information while entirely separate from said shell module means.

22. In a hand-held data capture system, (a) computerized processing module means for computerized processing of data, (b) shell module means having auxiliary means for executing an auxiliary function, having battery means supplying power thereto, and having a receptacle for receiving said computerized processing means so that the computerized processing module means is substantially contained within said shell module means during hand-held operation, and (c) coupling means providing communication between said shell module means and a computerized processing module means in said receptacle, (d) said shell module means with said computerized processing module means assembled in its receptacle having an overall size so as to be readily contained in a shirt pocket, (e) said computerized processing module means having input screen means for registering the path of movement of a stylus thereon so as to receiving manually entered path information while entirely separate from said shell module means.

\* \* \* \* \*